United States Patent
Dong et al.

(10) Patent No.: US 8,190,546 B2
(45) Date of Patent: May 29, 2012

(54) DEPENDENCY BETWEEN SOURCES IN TRUTH DISCOVERY

(75) Inventors: Xin Dong, Morristown, NJ (US); Laure Berti-Equille, Springfield, NJ (US); Divesh Srivastava, Summit, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 546 days.

(21) Appl. No.: 12/466,849

(22) Filed: May 15, 2009

(65) Prior Publication Data

US 2010/0293129 A1    Nov. 18, 2010

(51) Int. Cl.
  *G06N 5/00* (2006.01)
(52) U.S. Cl. .......................... 706/45; 707/690
(58) Field of Classification Search .......... 706/45; 707/690
  See application file for complete search history.

(56) References Cited

U.S. PATENT DOCUMENTS

| | | |
|---|---|---|
| 5,088,048 A | 2/1992 | Dixon et al. |
| 5,438,511 A | 8/1995 | Maxwell, III et al. |
| 6,028,987 A | 2/2000 | Hirairi |
| 6,915,270 B1 | 7/2005 | Young et al. |
| 7,249,117 B2 | 7/2007 | Estes |
| 2002/0010691 A1 | 1/2002 | Chen |
| 2005/0097146 A1 | 5/2005 | Konstantinou et al. |
| 2005/0210015 A1 | 9/2005 | Zhou et al. |

OTHER PUBLICATIONS

Yin et al ("Truth Discovery with Multiple Conflicting Information Providers on the Web" Aug. 2007).*
Berti-Equille et al ("Sailing the Information Ocean with Awareness of Currents: Discovery and Application of Source Dependence" Jan. 2009).*
Dong et al ("Integrating Conflicting Data: The Role of Source Dependence" Aug. 2008).*

* cited by examiner

*Primary Examiner* — David R Vincent
*Assistant Examiner* — Lut Wong
(74) *Attorney, Agent, or Firm* — Jackson Walker L.L.P.

(57) ABSTRACT

A method and system for truth discovery may implement a methodology that accounts for accuracy of sources and dependency between sources. The methodology may be based on Bayesian probability calculus for determining which data object values published by sources are likely to be true. The method may be recursive with respect to dependency, accuracy, and actual truth discovery for a plurality of sources.

24 Claims, 15 Drawing Sheets

DEPENDENCY BETWEEN SOURCES IN TRUTH DISCOVERY

BACKGROUND

1. Field of the Disclosure

The present disclosure relates to truth discovery and, more particularly, to source dependency in truth discovery.

2. Description of the Related Art

Many data-management applications, such as integrating data from the Web, managing enterprise data, managing community data, and sharing scientific data, require integrating data from multiple sources. Each source may assert that a published set of data objects represent truthful facts. However, different sources may claim conflicting facts, indicating that at least some sources are in error. Some sources may exhibit dependency by copying data from other sources, which may further obscure determining the actual truth.

DESCRIPTION OF EXEMPLARY EMBODIMENTS

Figure 1:
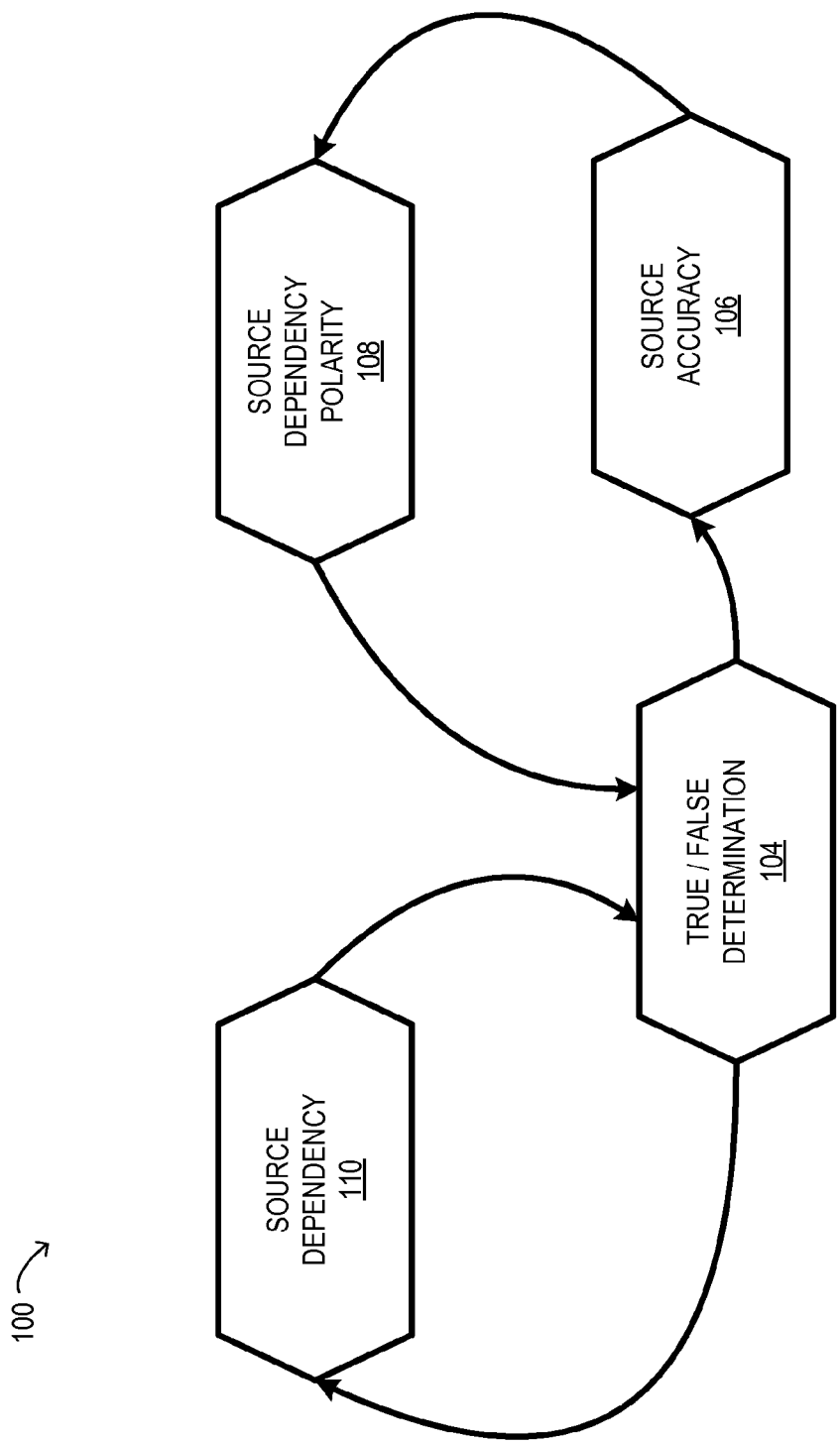
FIG. 1 is a block diagram of selected elements of an embodiment of a truth discovery methodology.

Many data-management applications, such as integrating data from the Internet, managing enterprise data, managing community data, assessing news and financial data, and sharing scientific data, among others, may require integrating data from multiple sources. As used herein, a "source" provides, i.e., publishes or broadcasts, data, for example, in a public or a private domain. The data may include information on one or more topics. In many embodiments, the data sources are relational databases, and objects are tuples and can be identified by keys, whereas data are values on particular attributes. A data structure provided by a source is referred to herein as a "data object," while a particular value (i.e., portion of information) associated with a data object is referred to as a "data object value."

A source may suggest, either implicitly or explicitly, that the provided data are truthful facts. However, different sources providing data on the same topic may publish conflicting facts, indicating that at least some of the sources are publishing an error. As used herein, methods of "truth discovery" are directed towards distinguishing which data provided by sources are indeed truthful facts, and more broadly, which sources may be considered reliable or accurate in providing truthful facts.

In one typical model, it may be expected that true data are published by more sources than specific false data, when multiple sources provide data on the same topic. In this case, a voting method may presumably be applied to determine which data represents the true fact. Among the sources providing the data, the number of sources providing each version of the data are counted by voting, and the data published by the most sources is taken for the truth. Although this methodology may provide truth discovery, there is an underlying assumption that the sources are independent of each other for the results to be consistently accurate. For example, data published by one source, regardless if true or false, can be copied by many other sources, which would violate the underlying option.

Unfortunately, it has been observed that false or untruthful data may be propagated through copying between sources. Copying or sharing data between sources is referred to herein as "dependency" of sources, while the direction of transfer of the data is denoted by "dependency polarity." As used herein, a "child" source obtains or receives data from a "parent" source.

Accordingly, there may be two types of data sources: independent sources and dependent sources (i.e., copiers). An independent source may provide data without dependency on other sources. A copier may copy a certain percentage of data from other sources (independent sources and/or copiers) and may provide some data independently (by examining and revising copied data or adding new data). As used herein, a "global copy probability" signifies an overall likelihood that sources copy data from one another (i.e., a global extent that dependency exists).

The existence of dependency between sources introduces additional complexity into a solution for truth discovery. In different implementations, either directional dependence, where it is known which data source copies from which, or undirectional dependence, where the copy direction remains unknown, may be considered. In some embodiments described herein, both undirectional and directional contributions to dependency are considered. Given a set of data sources, a copier may be allowed to copy from multiple sources (by union, intersection, etc.). In some embodiments contemplated herein, cyclic copying among sources is excluded.

If two data sources provide the same true fact, it may not be evident if they are dependent or not. However, if the two sources provide the same false fact, a much greater likelihood that one source copies from the other may be assumed. Using this intuitive assumption, an objectivist Bayesian analysis using probability calculus may be applied to determine dependency between sources. Based on Bayesian probabilities, an algorithm that iteratively detects dependency and discovers truth from conflicting information may be designed. It is noted that the detection of dependency between data sources is based on having obtained the true facts, or true values for data. However, deciding the true facts may be based on obtaining source dependency. Accordingly, a recursive relationship may exist between iterations of the truth discovery algorithms, or portions thereof, described herein.

As will be described in detail below, a methodology for truth discovery may distinguish data that are true facts from conflicting information provided by a large number of sources, among which some sources may copy from other sources. The methodology may consider dependency between data sources in truth discovery. Furthermore, the accuracy of a given data source may be considered for truth discovery, such that more weight may be given to data provided by more accurate sources. For example, if it has been determined that most data provided by a source are true, the source may be regarded as being more accurate, or having earned a higher degree of confidence for its published data. It is noted that a determination of accuracy may be based on dependency between sources, because otherwise, sources being duplicated many times may be incorrectly considered more accurate. Thus, the copying of data between sources may lead to an even greater bias in truth discovery using certain voting algorithms. As will be described in detail herein, the notion of accuracy of sources may also be incorporated in an analysis of source dependence, and used to design an algorithm for truth discovery that considers both dependency between sources and accuracy of sources.

In one aspect, a disclosed method for estimating dependency between sources of data object values includes obtaining a plurality of data object values from a first source and from a second source, wherein each source provides up to one value for a data object, including obtaining an indication of whether each obtained data object value from each source is true or is false. The method may further include determining a shared factor indicative of a fraction of the obtained data object values that are shared between the first source and the second source, and determining a false shared factor indicating a fraction of the shared data object values that are false values. The method may still further include estimating a dependency probability indicative of a likelihood that the first source and the second source are dependent, wherein the dependency probability is a function of the shared factor and the false shared factor, and outputting the dependency probability. The dependency probability may increase with the shared factor, and may further increase with the false shared factor.

In another aspect, a disclosed method for estimating dependency polarity between sources of data object values includes obtaining a plurality of data object values from a first source and from a second source, wherein each source provides up to one value for a data object, including obtaining an indication of whether each obtained data object value from each source is true or is false. The method may further include determining which of the data object values are shared between the first and the second source, determining a shared accuracy indicative of the fraction of the shared values that are true values, and determining a first unshared accuracy indicative of the fraction of the unshared values for the first source that are true. The method may still further include estimating a first probability of dependency polarity indicating a likelihood that the first source is dependent on the second source, wherein the first probability of dependency polarity increases as a first absolute difference between the shared accuracy and the first unshared accuracy increases, and outputting the first probability of dependency polarity. The method may yet further include determining a second unshared accuracy indicative of the fraction of the unshared values for the second source that are true, estimating a second probability of dependency polarity indicating a likelihood that the second source is dependent on the first source, wherein the second probability of dependency polarity increases as a second absolute difference between the shared accuracy and the second unshared accuracy increases. The second probability of dependency polarity may also be outputted.

In some embodiments, asserting dependency polarity may be based on the greater of the first and second probabilities of dependency polarity. The method may further include comparing a threshold probability for dependency with the first and second probabilities of dependency polarity, asserting dependency for probabilities of dependency polarity above the threshold probability. The first probability of dependency polarity may be a linear function of the first absolute difference, while the second probability of dependency polarity may be a linear function of the second absolute difference. The first and second probabilities of dependency polarity may be normalized such that the sum of the first and second probabilities of dependency polarity is unity.

In yet another aspect, a disclosed truth discovery method for a data object value provided by a plurality of sources includes obtaining dependency probabilities for pairs of the plurality of sources of the data object value, obtaining dependency polarity probabilities for the pairs of the plurality of sources, and using the dependency probabilities and dependency polarity probabilities to generate at least one dependence graph for the plurality of sources. The method may further include calculating a graph probability for each of the at least one dependence graphs, and determining a truth count for the data object value by summing a graph truth count for each of the at least one dependence graphs, wherein the graph truth count is based on the graph probability, and outputting the truth count for the data object value.

In some instances, calculating the graph probability may further include enumerating a set of dependency graphs representing dependency and dependency polarity permutations for the pairs of sources. For each dependency graph in the enumerated set, the method may include calculating a dependency value for each of the pairs of sources, and calculating the graph probability as a product of the dependency values for the pairs. For a pair with a dependency edge, the dependency value may be calculated as a product of the dependency probability and the dependency polarity probability for the pair. For a pair without a dependency edge, the dependency value may be calculated as an independency probability, given by one minus the dependency probability, for the pair. A normalized graph probability for a dependency graph may be calculated by dividing the graph probability for the dependency graph by the sum of the graph probabilities for the set. The graph truth count may be calculated as a product of a weighted dependency of sources and the normalized graph probability for the dependency graph.

In some cases, determining the weighted dependency of sources may include obtaining a global copy probability representing the likelihood that pairs of sources are dependent. For each source with no dependency edges or with only parent dependency polarity in the dependency graph, a count of one may be assigned. For each source with at least one child dependency polarity in the dependency graph, a count may be assigned as the global copy probability raised to the exponent given by the number of child dependency polarities. The assigned counts for sources in the dependency graph may be summed.

In certain instances, determining whether the data object value is true or false may be accomplished by comparing the truth count for the data object value with a threshold truth count. A truth probability for the data object value for the plurality of sources may be determined based on the truth count. The truth probability may be indicative of a fraction given by the truth count over a number of the plurality of sources. The method may further include determining an accuracy for sources not included in the plurality of sources based on the truth probability for the data object value. A revised dependency probability between the pairs of the plurality of sources may be estimated based on operations for determining the truth count. A revised probability of dependency polarity between the pairs of the plurality of sources may be estimated based on operations for determining the truth count.

In another aspect, a disclosed system for truth discovery according to the methods described herein includes a processor, and memory media accessible to the processor, including processor executable instructions for truth discovery. The processor executable instructions may be configured to execute at least some of the operations for truth discovery described herein.

In still another aspect, a disclosed computer-readable memory media includes executable instructions for truth discovery. The executable instructions may be configured to execute at least some of the operations for truth discovery described herein.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Referring now to FIG. 1, a block diagram of selected elements of methodology 100 for truth discovery is illustrated. Methodology 100, as depicted in FIG. 1, represents different operations or modules, and the logical data flow between them. The cyclical nature of the data flow in methodology 100 represents the recursive nature of truth discovery algorithms described herein. In different embodiments, a recursive method may begin by obtaining certain values for an initial iteration. As used herein, "obtaining" refers to assuming, estimating, or receiving given values for parameters prior to performing calculations, such as those associated with methodology 100. Although the methods described herein refer to exemplary embodiments of methodology 100 for clarity, it is noted that aspects of the disclosure related to truth discovery may be practiced with other types of methodologies.

In FIG. 1, true/false determination 104 represents operations that determine if certain data objects provide true or false values, or determine the probability thereof. Thus, true/false determination 104 may employ various methods to determine truthful facts (see FIGS. 7 and 8A-C). In one embodiment, a reference value regarded as a truthful fact may be used to compare data objects to see if data object values match to the truthful fact or not. A matching data object value, such as a text string, may not be a literally exact match with a truthful reference value. The matching may accommodate certain variations in values, such as spelling errors, abbreviations, rounding, unit differences, etc., to ascertain a logical match.

In certain instances, a truth probability for data objects and/or data object values may be determined using an analysis of dependency and/or accuracy. In certain cases, true/false determination 104 may obtain an indication of truthfulness of data object values. The data flow emanating from true/false determination 104 may thus include an indication of truthfulness, i.e., whether true or false, for data objects and/or data object values. As shown in FIG. 1, true/false determination 104 may rely on results provided by source dependency 110 and source dependency polarity 108, as will be described below in further detail (see FIGS. 5 and 6).

As shown in FIG. 1, source dependency 110 represents operations that determine if sources copy data object values. The determination made by source dependency 110 may be a dependency probability, or the likelihood that sources are dependent. An independency probability may be given by one minus the dependency probability. The dependency probability and independency probability may be determined for pairs of sources. Source dependency 110 may employ various algorithms to determine dependency (see FIG. 5). In one example, dependency probability is a function of the number of shared data source values and the number of false data source values. Thus, source dependency 110 may rely upon an indication of truthfulness of data object values provided by true/false determination 104.

Also in FIG. 1, source accuracy 106 represents operations that determine the accuracy of sources. Source accuracy 106 may generate various measures indicating relative or absolute accuracy of sources. In some embodiments, accuracy values for a sample population of sources may be used to extrapolate global accuracy values. Source accuracy 106 may also rely upon an indication of truthfulness of data object values provided by true/false determination 104. The results of source accuracy 106 may be provided to source dependency polarity 108, which represents operations that determine the direction of dependency between sources (see FIG. 6). It is noted that source dependency 110 and source dependency polarity 108 represent independent determinations for data sources. Source dependency polarity 108 may generate a probability that a first source copies from a second source. In some instances, the probabilities for dependency polarity between two sources may be normalized to unity.

Figure 2:
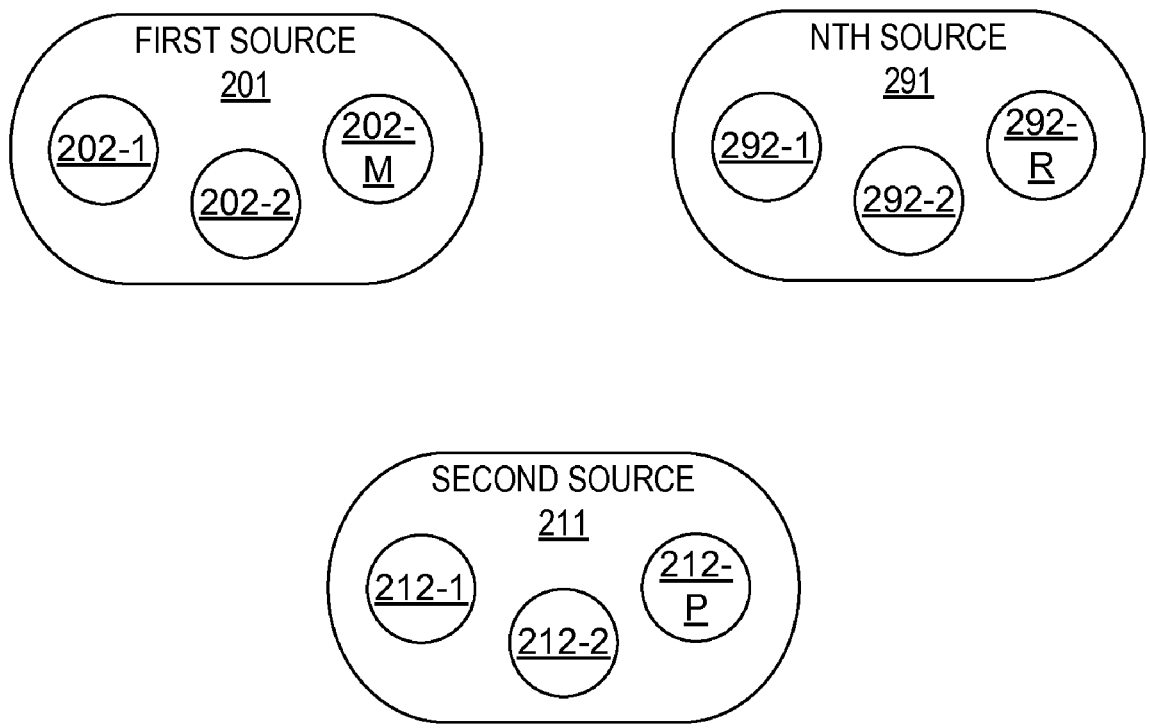
FIG. 2 is a block diagram of selected elements of a plurality of information sources.

Turning now to FIG. 2, a block diagram of selected elements of a plurality of information sources is illustrated. In FIG. 2, first source 201 and second source 211 represent two individual sources. There may be N individual sources, whereby N may be a large number, represented by Nth source 291. An individual source may include a number of data objects. For example, first source 201 may include data object 202-1, data object 202-2, up to M number of data objects, represented by data object 202-M. Accordingly, second source 211 may include data object 212-1, data object 212-2, up to P number of data objects, represented by data object 212-P. Similarly, Nth source 291 may include data object 292-1, data object 292-2, up to R number of data objects, represented by data object 292-R. The values M, P and R may all be different values, while the data objects 202-1, 212-1, and 292-1 may not correspond to the same topic. However, at least some data objects from first source 201, second source 211 and Nth source 291 may correspond to the same topic, and may provide data object values representing the same information, even though the actual values may be different (i.e., true or false).

In some cases, at least some of the sources, such as first source 201, second source 211, up to Nth source 291, may share or copy data object values from one another. That is, at least some of the sources depicted in FIG. 2 may exhibit dependency for a specific data object value between each other. The data sources, as illustrated in FIG. 2, provide an example, similar to many real-life examples, of an environment or system that may be used as a model for truth discovery, as will be described in detail below.

As will be evident from FIG. 2, a particular environment, or system, of multiple sources, each publishing a variety of data objects, may result in a myriad of possible data object values, for which dependency may be evaluated. For each data object value, a dependency probability, an independency probability, and a dependency polarity probability may be obtained (see discussion of FIGS. 5 and 6 below). Then, the possible permutations of dependency among the sources for one or more data object values may be enumerated as a set of "dependency graphs" or simply "graphs." The dependency graphs may be used to evaluate the possible permutations of dependency, and subsequently determine a truth count, or truth probability, for each data object value.

In the following sections, an example of generating dependency graphs for truth discovery is elaborated in detail for the case of three sources providing a data object value, as show in FIGS. 3A-D and 4A-D. The selection of three sources is chosen as an arbitrary example for describing the methods disclosed herein. Although the complexity of the operations described herein may increase drastically with the number of sources, it is noted that the methods disclosed herein are enabled for a substantially larger number of sources in different embodiments.

Between any two sources of a data object, three types of dependency, referred to as a "dependency edge" herein, or simply an "edge," may exist: no dependency (e.g., "edgeless"); child-parent dependency; and parent-child dependency. The latter two types represent the possible copy directions, or dependency polarity, of a dependency edge between two sources.

Turning now to FIGS. 3A-D, a block diagram of selected elements of dependency graphs for the case of three data sources (S1, S2 and S3) providing a data object value (not shown) are illustrated. In FIGS. 3A-D, an individual graph is represented by a triangle including the sources S1, S2 and S3, which may exhibit dependency edges, shown as arrows pointing from parent to child.

The possible permutations of graphs for the case of three sources, corresponding to FIGS. 3A-D, are listed in Table 1 below.

TABLE 1

Permutations of dependency graphs for a 3-source system (S1, S2 and S3).

| Graph | Edges | Edgeless | Independent | Single Copy | Dual Copy |
|---|---|---|---|---|---|
| A | 0 | S1, S2, S3 | S1, S2, S3 | none | none |
| B | 1 | S3 | S1, S3 | S2 | none |
| C | 1 | S1 | S1, S3 | S2 | none |
| D | 1 | S2 | S1, S2 | S3 | none |
| E | 1 | S3 | S2, S3 | S1 | none |
| F | 1 | S1 | S1, S2 | S3 | none |
| G | 1 | S2 | S2, S3 | S1 | none |
| H | 2 | none | S1 | S2, S3 | none |
| J | 2 | none | S2 | S1, S3 | none |
| K | 2 | none | S2 | S1, S3 | none |
| L | 2 | none | S2, S3 | none | S1 |
| M | 2 | none | S3 | S1, S2 | none |
| N | 2 | none | S1, S3 | none | S2 |
| O | 2 | none | S1 | S2, S3 | none |
| P | 2 | none | S3 | S1, S2 | none |
| Q | 2 | none | S1 | S2, S3 | none |
| R | 2 | none | S3 | S1, S2 | none |
| S | 2 | none | S1, S2 | none | S3 |
| T | 2 | none | S2 | S1, S3 | none |
| U | 3 | none | S2 | S3 | S1 |
| V | 3 | none | S1 | S2 | S3 |
| W | 3 | none | S1 | S3 | S2 |
| X | 3 | none | S3 | S2 | S1 |
| Y | 3 | none | S2 | S1 | S3 |
| Z | 3 | none | S3 | S1 | S2 |

In Table 1, a particular graph is denoted by a letter A-H, J-Z, which is used throughout the following example. The 25 possible graphs for truth discovery include the following permutations: zero edges (1 graph, FIG. 3A); one edge (6 graphs, FIG. 3B); two edges (12 graphs; FIG. 3C); and three edges (6 graphs, FIG. 3D). It is noted that the two cyclical graphs with three edges have been excluded from Table 1, and will be discussed below (see FIG. 3D). Edgeless sources listed in Table 1 are those without dependency edges for each graph. Independent sources are either edgeless or exhibit only parent dependency (i.e., no child dependency) in the corresponding graph. A Single Copy source exhibits child dependency from one parent, while a Dual Copy source exhibits child dependency from two parents for their respective graphs in Table 1.

Figure 3A:
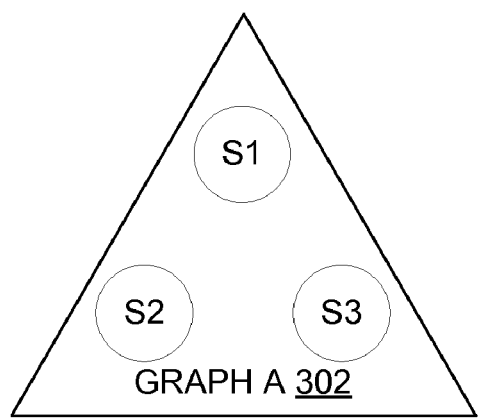
FIGS. 3A-D are block diagrams of an embodiment of enumerated dependency graphs.
Figure 3B:
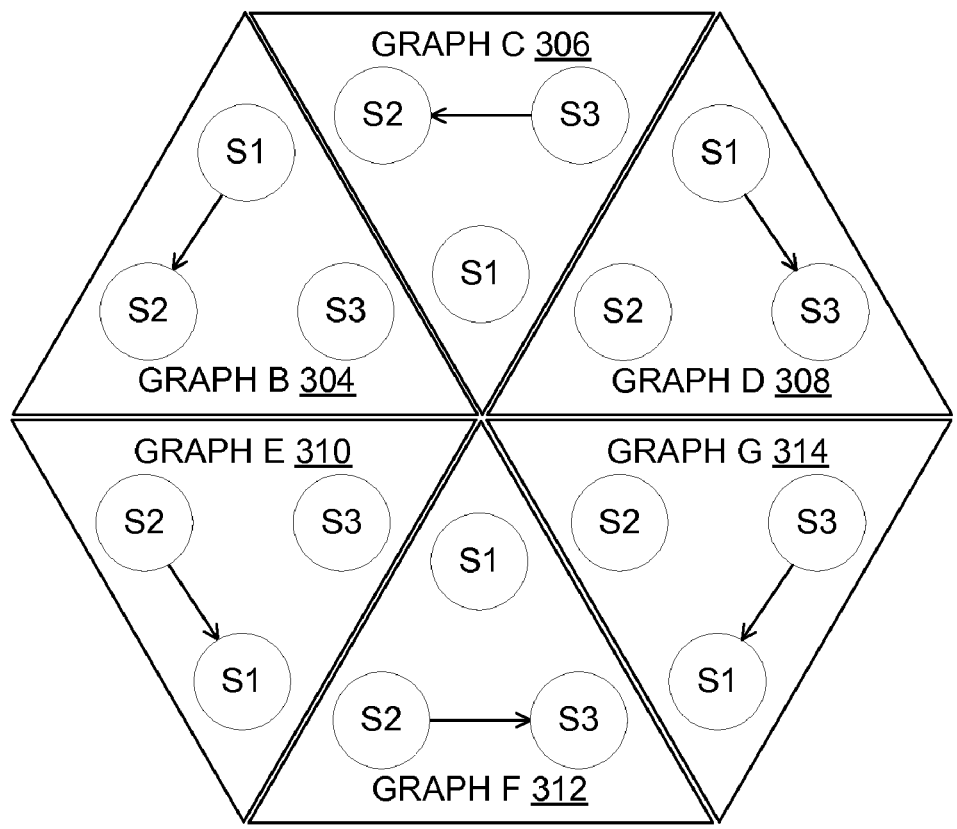
Figure 3C:
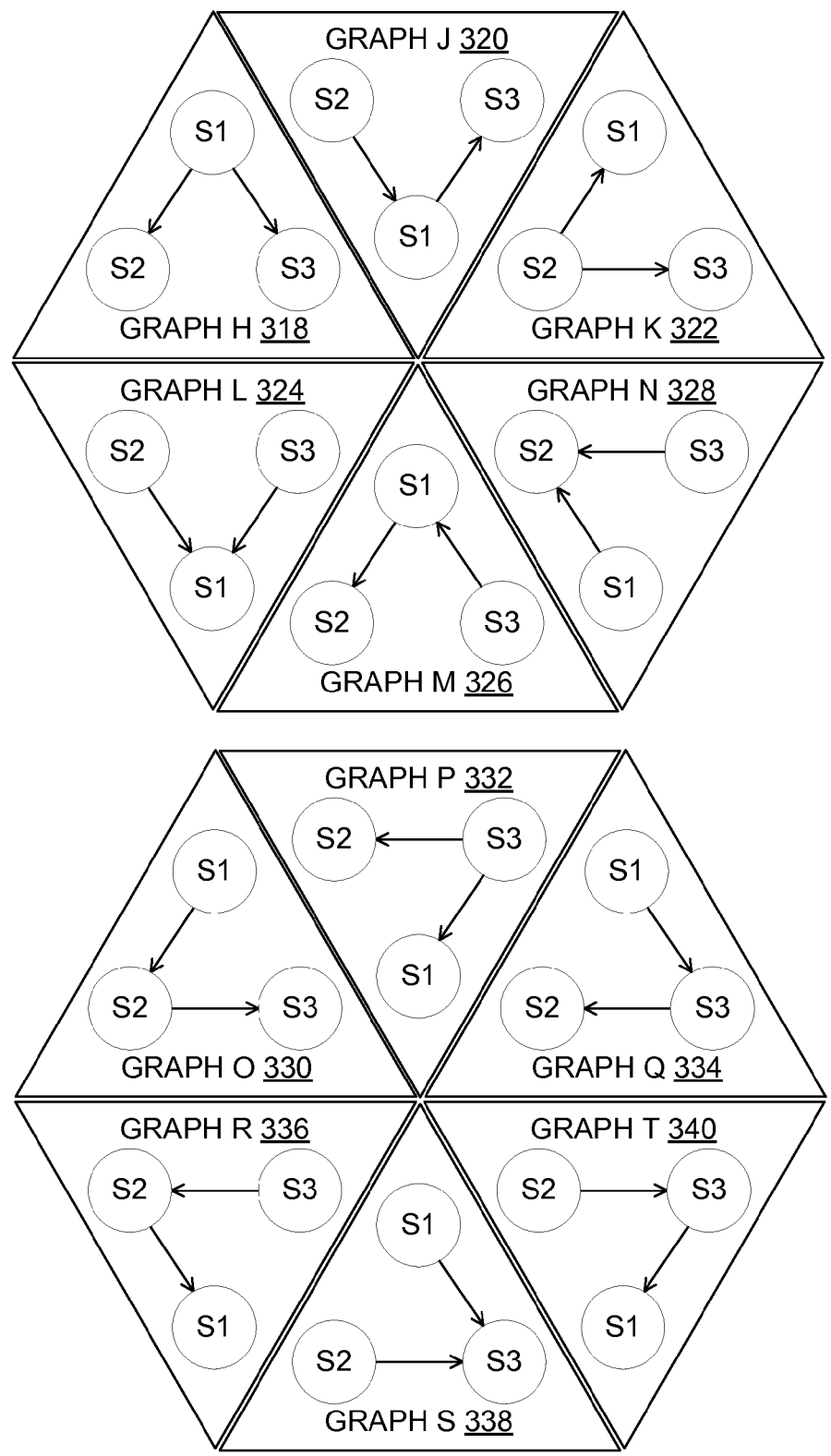

In FIG. 3A, Graph A 302 represents the single case with zero dependency edges between the sources (no arrows). In FIG. 3B, the six cases with one dependency edge are shown (one arrow). Graph B 304 shows dependency between parent S1 to child S2, while Graph C 306 shows dependency between parent S3 and child S2. The remaining permutations of single edge cases are similarly shown in Graph D 308, Graph E 310, Graph F 312, and Graph G 314.

In FIG. 3C, the twelve cases with two dependency edges are shown (two arrows). For example, Graph H 318 shows S1 with parent dependency to both S2 and S3. The remaining permutations of double edge cases are enumerated in Graph J 320, Graph K 322, Graph L 324, Graph M 326, Graph N 328, Graph O 330, Graph P 332, Graph Q 334, Graph R 336, Graph S 338, and Graph T 340.

Figure 3D:
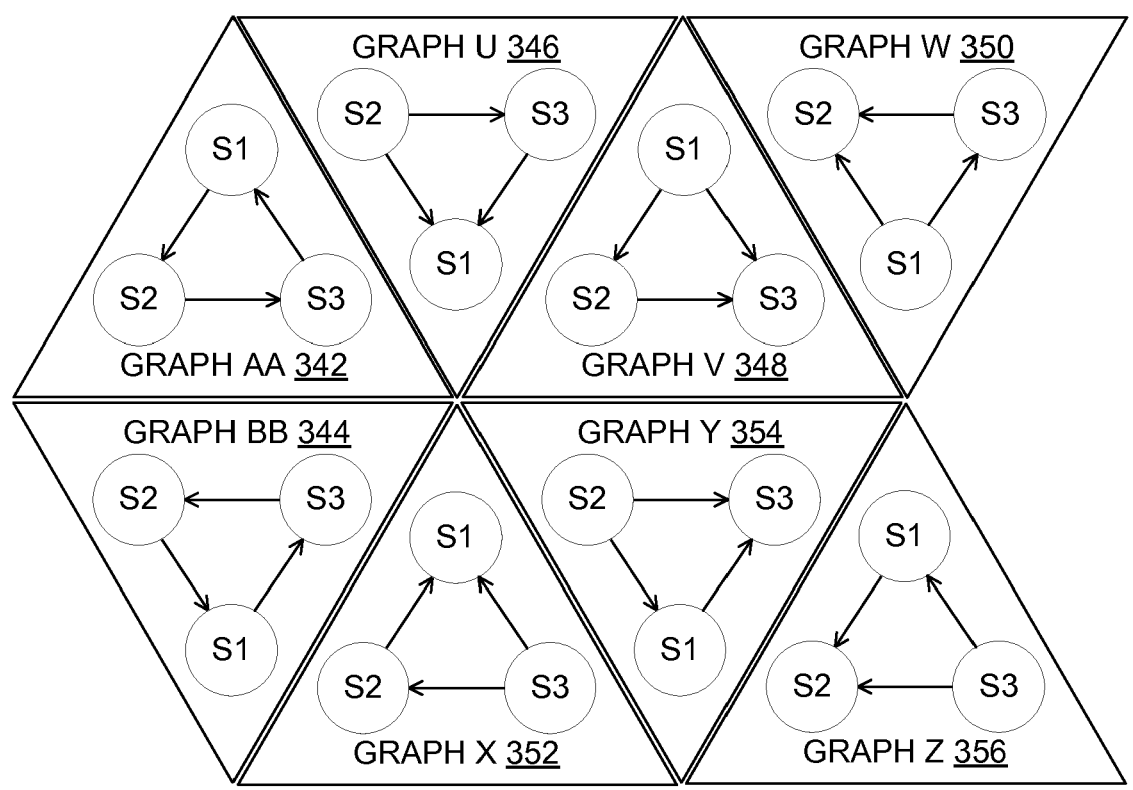

In FIG. 3D, the eight cases with three dependency edges are shown (three arrows). The two cases exhibiting cyclical dependency, Graph AA 342 and Graph BB 344, are excluded from further consideration in the truth discovery method, because they are not useful for evaluating dependency. The remaining six graphs show relevant dependency examples, such as Graph U 346, showing S2 having a parent relationship with S3 and S1, and S1 also as a child of parent S3. It is noted that in Graph U 346, S3 exhibits both parent and child dependency, which is permissible, but does not exhibit cyclical copying. The remaining permutations of triple edge cases are enumerated in Graph V 348, Graph W 350, Graph X 352, Graph Y 354, and Graph Z 356.

In Table 2, the values for dependency probability (D), dependency polarity probability (P), dependency product (DP), and independency probability (I) are shown for an example calculation for truth discovery for a three source system. It is noted that DP is the product of D and P for a given polarity. It is further noted that for a given pair of sources, D and I are independent of the source polarity, while the sum of D and I is unity for each polarity case. The sum of P for the two polarity cases for a given pair, such as such as 1-2 and 2-1, is also unity.

TABLE 2

Obtained values for source pairs in an exemplary embodiment of a three-source truth discovery calculation.

| Pair | D | P | DP | I |
|---|---|---|---|---|
| 2-3 | 0.3 | 0 | 0 | 0.7 |
| 3-2 | 0.3 | 1 | 0.3 | 0.7 |
| 1-3 | 0.5 | 0.4 | 0.2 | 0.5 |
| 3-1 | 0.5 | 0.6 | 0.3 | 0.5 |
| 1-2 | 0.1 | 0.5 | 0.05 | 0.9 |
| 2-1 | 0.1 | 0.5 | 0.05 | 0.9 |

The values in Table 2 may be used to calculate a graph probability for each dependency graph. It is noted that the values in Table 2 represent one embodiment of obtained values, presented for the purposes of an illustrative example. Actual values in a truth discovery calculation may be different for obtained values, or for individual iterations in a recursive methodology.

In Table 3 below, an example calculation of graph probability using the values in Table 2, for the dependency graphs shown in Table 1 and FIGS. 3A-D, is presented. The values in Table 3 represent dependency values for each pair of sources (i.e., for each edge or no edge) in the three source graph. For a pair without a dependency edge, the dependency value is calculated as the independency probability (I) for the pair. For a pair with a dependency edge, the dependency value is calculated as the dependency product (DP) for the polarity of the pair in the respective dependency graph. The graph probability (GP) is given by the product of the three dependency values for a given graph. The Raw GP is the direct product of the dependency values. The Norm GP is the Raw GP value normalized to the sum of all Raw GP values (i.e., 0.9970 in this example) for all the graphs in the set.

It is noted that since $P_{2-3}$ in Table 2 was zero, the subsequent products derived from $P_{23}$ are also zero in Table 3. In some embodiments, some dependency graphs having zero GP values, or certain zero values in Table 2, may be eliminated from further calculations. Eliminating the number of graphs may improve calculation efficiency by reducing the number of permutations for processing, without any effect on the remaining results. For clarity in the present example, graphs with zero GP values are included in the results.

TABLE 3

Example calculation of graph probability for an exemplary embodiment of a three-source truth discovery calculation.

| Graph | Edge | Value | Edge | Value | Edge | Value | Raw GP | Norm GP |
|---|---|---|---|---|---|---|---|---|
| A | $I_{12/21}$ | 0.90 | $I_{13/31}$ | 0.5 | $I_{32/23}$ | 0.7 | 0.3150 | 0.3159 |
| B | $DP_{12}$ | 0.05 | $I_{13/31}$ | 0.5 | $I_{32/23}$ | 0.7 | 0.0175 | 0.0176 |
| C | $I_{12/21}$ | 0.90 | $I_{13/31}$ | 0.5 | $DP_{32}$ | 0.3 | 0.1350 | 0.1354 |
| D | $I_{12/21}$ | 0.90 | $DP_{13}$ | 0.2 | $I_{32/23}$ | 0.7 | 0.1260 | 0.1264 |
| E | $DP_{21}$ | 0.05 | $I_{13/31}$ | 0.5 | $I_{32/23}$ | 0.7 | 0.0175 | 0.0176 |
| F | $I_{12/21}$ | 0.90 | $I_{13/31}$ | 0.5 | $DP_{23}$ | 0.0 | 0.0000 | 0.0000 |
| G | $I_{12/21}$ | 0.90 | $DP_{31}$ | 0.3 | $I_{32/23}$ | 0.7 | 0.1890 | 0.1896 |
| H | $DP_{12}$ | 0.05 | $DP_{13}$ | 0.2 | $I_{32/23}$ | 0.7 | 0.0070 | 0.0070 |
| J | $DP_{21}$ | 0.05 | $DP_{13}$ | 0.2 | $I_{32/23}$ | 0.7 | 0.0070 | 0.0070 |
| K | $DP_{21}$ | 0.05 | $I_{13/31}$ | 0.5 | $DP_{23}$ | 0.0 | 0.0000 | 0.0000 |
| L | $DP_{21}$ | 0.05 | $DP_{31}$ | 0.3 | $I_{32/23}$ | 0.7 | 0.0105 | 0.0105 |
| M | $DP_{12}$ | 0.05 | $DP_{31}$ | 0.3 | $I_{32/23}$ | 0.7 | 0.0105 | 0.0105 |
| N | $DP_{12}$ | 0.05 | $I_{13/31}$ | 0.5 | $DP_{32}$ | 0.3 | 0.0075 | 0.0075 |
| O | $DP_{12}$ | 0.05 | $I_{13/31}$ | 0.5 | $DP_{23}$ | 0.0 | 0.0000 | 0.0000 |
| P | $I_{12/21}$ | 0.90 | $DP_{31}$ | 0.3 | $DP_{32}$ | 0.3 | 0.0810 | 0.0812 |
| Q | $I_{12/21}$ | 0.90 | $DP_{13}$ | 0.2 | $DP_{32}$ | 0.3 | 0.0540 | 0.0542 |
| R | $DP_{21}$ | 0.05 | $I_{13/31}$ | 0.5 | $DP_{32}$ | 0.3 | 0.0075 | 0.0075 |
| S | $I_{12/21}$ | 0.90 | $DP_{13}$ | 0.2 | $DP_{23}$ | 0.0 | 0.0000 | 0.0000 |
| T | $I_{12/21}$ | 0.90 | $DP_{31}$ | 0.3 | $DP_{23}$ | 0.0 | 0.0000 | 0.0000 |
| U | $DP_{21}$ | 0.05 | $DP_{31}$ | 0.3 | $DP_{23}$ | 0.0 | 0.0000 | 0.0000 |
| V | $DP_{12}$ | 0.05 | $DP_{13}$ | 0.2 | $DP_{23}$ | 0.0 | 0.0000 | 0.0000 |
| W | $DP_{12}$ | 0.05 | $DP_{13}$ | 0.2 | $DP_{32}$ | 0.3 | 0.0030 | 0.0030 |
| X | $DP_{21}$ | 0.05 | $DP_{31}$ | 0.3 | $DP_{32}$ | 0.3 | 0.0045 | 0.0045 |
| Y | $DP_{21}$ | 0.05 | $DP_{13}$ | 0.2 | $DP_{23}$ | 0.0 | 0.0000 | 0.0000 |
| Z | $DP_{12}$ | 0.05 | $DP_{31}$ | 0.3 | $DP_{32}$ | 0.3 | 0.0045 | 0.0045 |
| SUM GP | | | | | | | 0.9970 | 1.0000 |

Referring now to FIGS. 4A-D, block diagrams of selected elements of embodiments of graph dependency calculations are illustrated. In the embodiments depicted in FIGS. 4A-D, the graph permutations correspond to those presented in FIGS. 3A-D, while the values correspond to those presented in Tables 2 and 3 above.

Figure 4A:
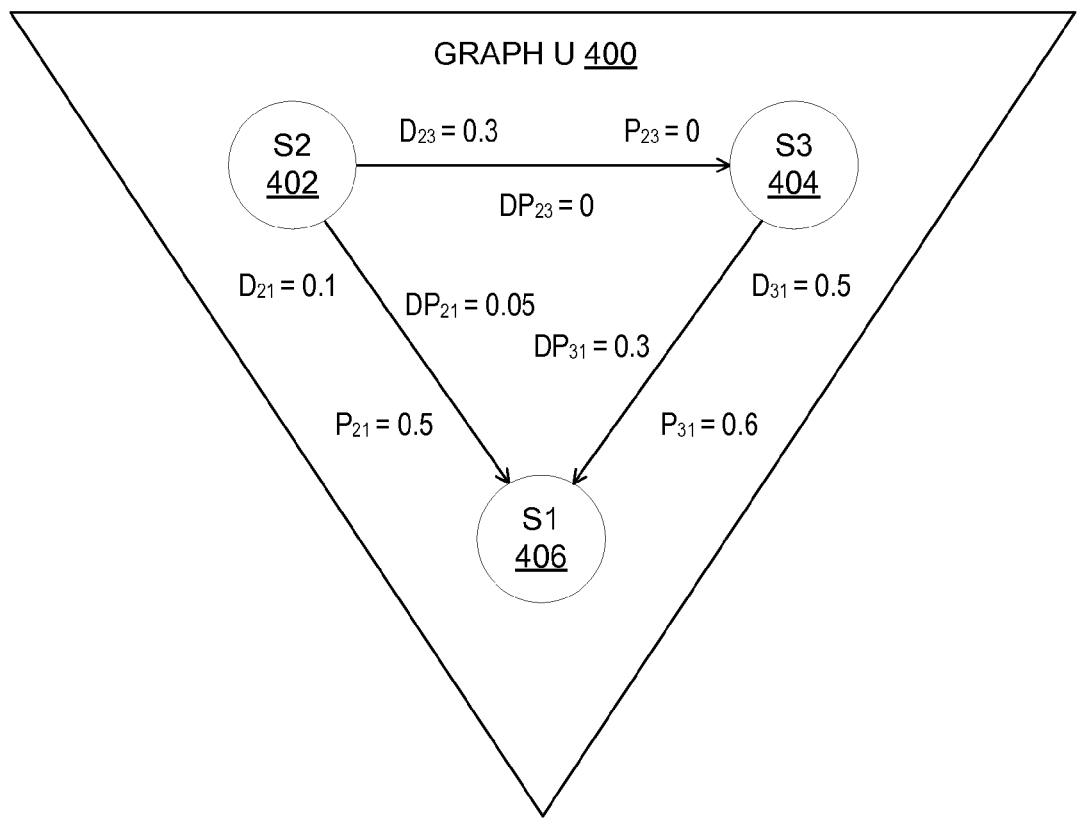
FIGS. 4A-D are block diagrams of selected elements of embodiments of graph dependency probabilities.

In FIG. 4A, Graph U 400 is shown with S1 406, S2 402, and S3 404, and corresponds to Graph U 346 (see FIG. 3D). In Graph U 400, a parent-child dependency edge 2-3 exists between S2 and S3, a parent-child dependency edge 2-1 exists between S2 and S1, and a parent-child dependency edge 3-1 exists between S3 and S1. Accordingly, the following equations describe the calculation of the dependency values for edges 2-3, 2-1, and 3-1 for Graph U 400:

$$DP_{23}=D_{23}*P_{23}=(0.30)*(0.00)=0.00 \quad \text{Equation [1]}$$

$$DP_{21}=D_{21}*P_{21}=(0.10)*(0.50)=0.05 \quad \text{Equation [2]}$$

$$DP_{31}=D_{31}*P_{31}=(0.50)*(0.60)=0.30 \quad \text{Equation [3]}$$

Figure 4B:
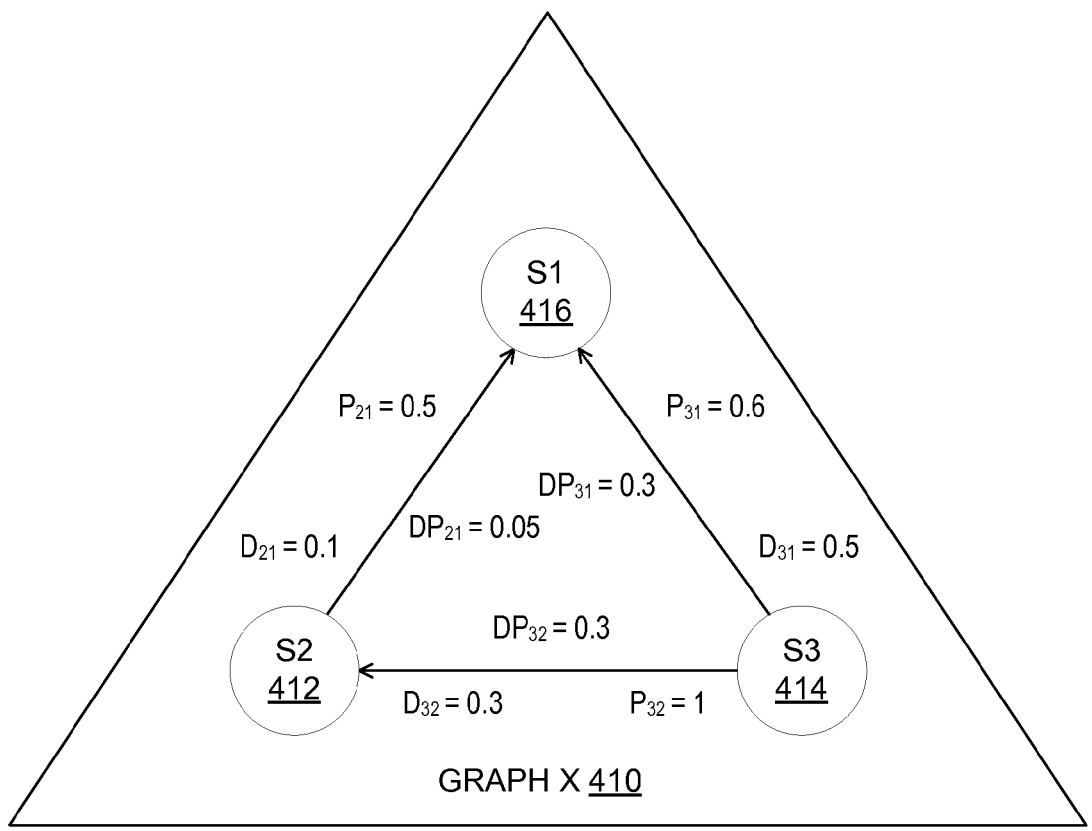

In FIG. 4B, Graph X 410 is shown with S1 416, S2 412, and S3 414, and corresponds to Graph X 352 (see FIG. 3D). In Graph X 410, a parent-child dependency edge 3-2 exists between S3 and S2, a parent-child dependency edge 2-1 exists between S2 and S1, and a parent-child dependency edge 3-1 exists between S3 and S1. Accordingly, the following equations describe the calculation of the dependency values for edges 3-2, 2-1, and 3-1 for Graph X 410:

$$DP_{32}=D_{32}*P_{32}=(0.30)*(1.00)=0.30 \quad \text{Equation [4]}$$

$$DP_{21}=D_{21}*P_{21}=(0.10)*(0.50)=0.05 \quad \text{Equation [5]}$$

$$DP_{31}=D_{31}*P_{31}=(0.50)*(0.60)=0.30 \quad \text{Equation [6]}$$

Figure 4C:
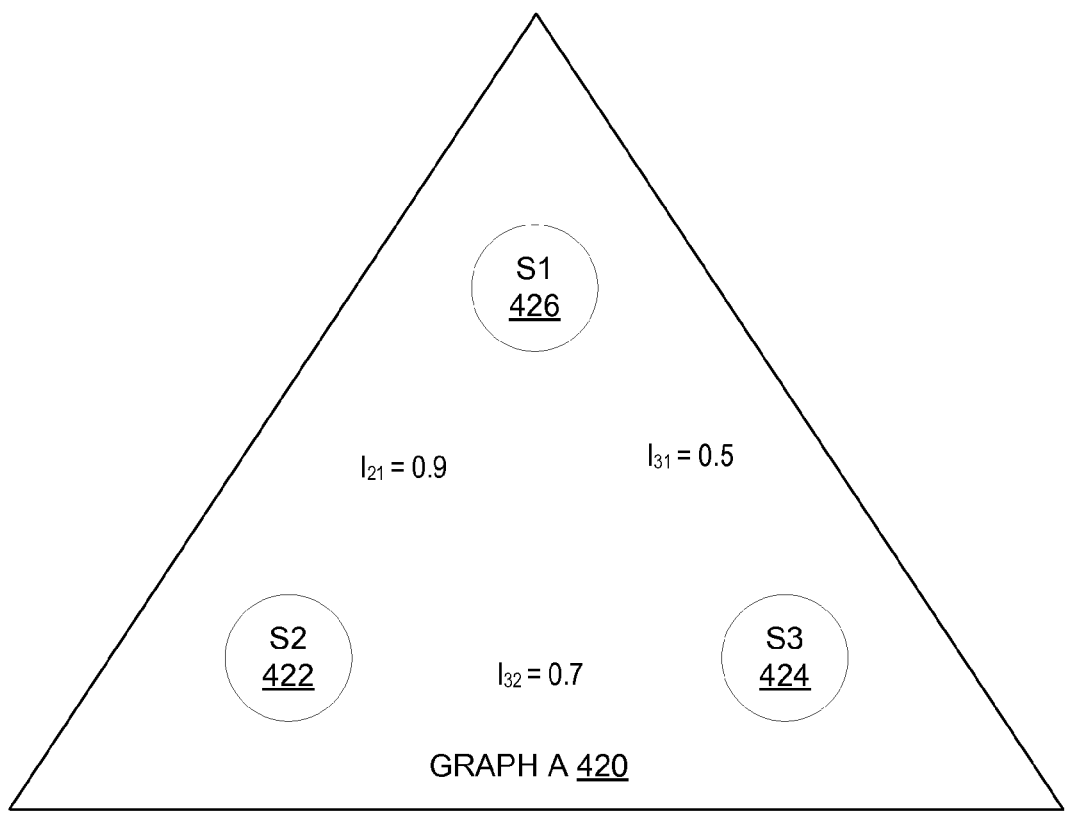

In FIG. 4C, Graph A 420 is shown with S1 426, S2 422, and S3 424, and corresponds to Graph A 302 (see FIG. 3A). In Graph A 420, no dependency edge exists between S3 and S2, no dependency edge exists between S2 and S1, and no dependency edge exists between S3 and S1. Accordingly, the following equations describe the calculation of the dependency values for Graph A 420:

$$I_{32/23}=(1-D_{32/23})=1-0.30=0.70 \quad \text{Equation [7]}$$

$$I_{21/12}=(1-D_{21/12})=1-0.10=0.90 \quad \text{Equation [8]}$$

$$I_{31/13}=(1-D_{31/13})=1-0.50=0.50 \quad \text{Equation [9]}$$

Figure 4D:
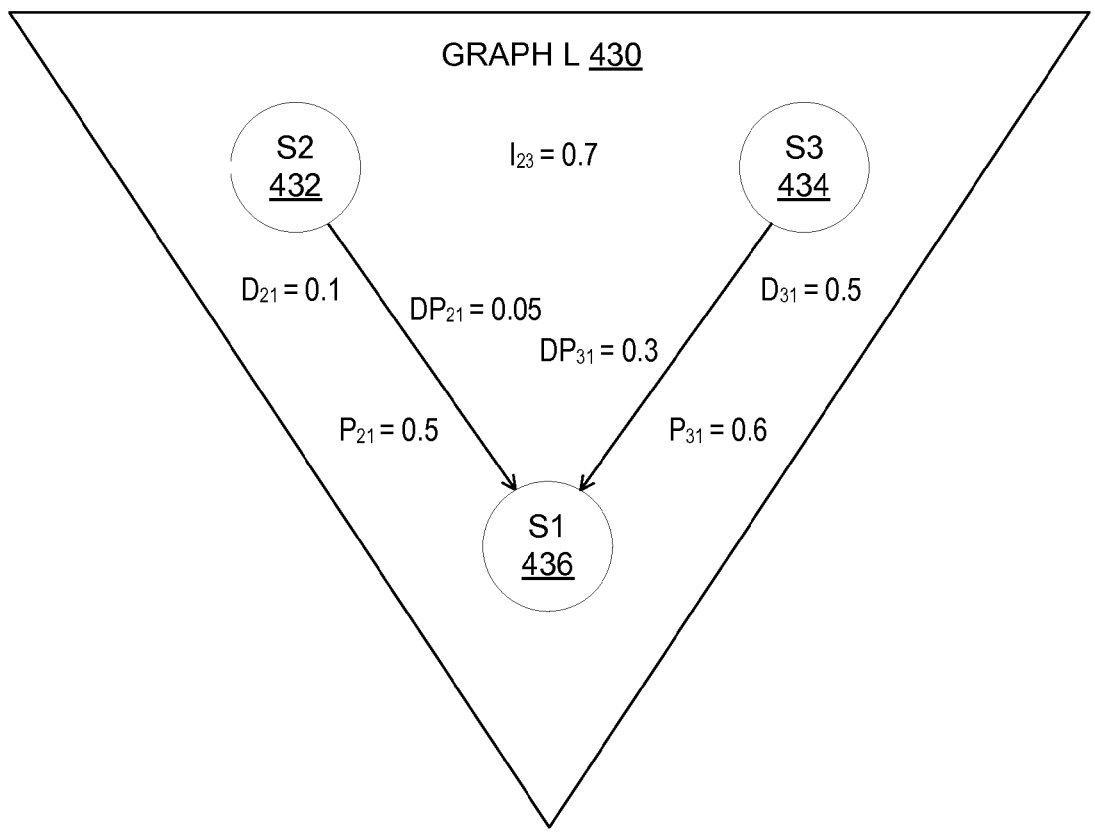

In FIG. 4D, Graph L 430 is shown with S1 436, S2 432, and S3 434, and corresponds to Graph L 324 (see FIG. 3C). In Graph L 430, no dependency edge exists between S3 and S2, a parent-child dependency edge 2-1 exists between S2 and S1, and a parent-child dependency edge 3-1 exists between S3 and S1. Accordingly, the following equations describe the calculation of the dependency values for edges 2-1 and 3-1 for Graph L 430:

$$I_{32/23}=(1-D_{32/23})=1.00-0.30=0.70 \quad \text{Equation [10]}$$

$$DP_{21}=D_{21}*P_{21}=(0.10)*(0.50)=0.05 \quad \text{Equation [11]}$$

$$DP_{31}=D_{31}*P_{31}=(0.50)*(0.60)=0.30 \quad \text{Equation [12]}$$

After the normalized GPs for the enumerated set of graphs have been calculated, a truth count for each graph may be determined based on a weighted dependency of sources. As mentioned above, the global copy probability may be used to determine the weighted dependency of sources. In the present example, it may be assumed that 80% of all sources do not exhibit dependency, such that the global copy probability=0.20 or 20%. Using this value, the truth counts for the enumerated set of graphs are calculated in Table 4.

The truth count is calculated for each source, which may have zero, single, or dual child dependencies. Zero child dependencies result from a source that is edgeless or only has parent dependency, indicating that this source does not copy from other sources. A single child dependency source exhibits one edge from another source, while a dual child dependency source exhibits two edges from two different sources. For sources with zero child dependencies, a truth count of one is assigned. For sources with child dependencies, a truth count according to the following equation is assigned.

$$\text{Source Truth Count}=GPC^{CD} \quad \text{Equation [13]},$$

where GPC is the global copy probability, and CD is the integer number of child dependencies. In the present example with three sources, CD may be 1 or 2. As shown in Table 4, the count for each source in each dependency graph is totaled and then multiplied by the Norm GP to yield a truth count for each graph. The sum of the individual graph truth count is an indication of the truthfulness of the data object value provided by S1, S2 and S3 (in this example 2.3043). The maximum possible value for the truth count in this example is 3.000, corresponding to three independent sources.

TABLE 4

Truth count calculation for an exemplary embodiment of a three-source truth discovery calculation, assuming a global copy probability of 20%.

| Graph | S1 Dep. | Count | S2 Dep. | Count | S3 Dep. | Count | Total | Norm GP | Truth Count |
|---|---|---|---|---|---|---|---|---|---|
| A | none | 1.00 | none | 1.00 | none | 1.00 | 3.00 | 0.3159 | 0.9478 |
| B | none | 1.00 | single | 0.20 | none | 1.00 | 2.20 | 0.0176 | 0.0386 |
| C | none | 1.00 | single | 0.20 | none | 1.00 | 2.20 | 0.1354 | 0.2979 |
| D | none | 1.00 | none | 1.00 | single | 0.20 | 2.20 | 0.1264 | 0.2780 |
| E | single | 0.20 | none | 1.00 | none | 1.00 | 2.20 | 0.0176 | 0.0386 |
| F | none | 1.00 | none | 1.00 | single | 0.20 | 2.20 | 0.0000 | 0.0000 |
| G | single | 0.20 | none | 1.00 | none | 1.00 | 2.20 | 0.1896 | 0.4171 |
| H | none | 1.00 | single | 0.20 | single | 0.20 | 1.40 | 0.0070 | 0.0098 |
| J | single | 0.20 | none | 1.00 | single | 0.20 | 1.40 | 0.0070 | 0.0098 |
| K | single | 0.20 | none | 1.00 | single | 0.20 | 1.40 | 0.0000 | 0.0000 |
| L | dual | 0.04 | none | 1.00 | none | 1.00 | 2.04 | 0.0105 | 0.0215 |
| M | single | 0.20 | single | 0.20 | none | 1.00 | 1.40 | 0.0105 | 0.0147 |
| N | none | 1.00 | dual | 0.04 | none | 1.00 | 2.04 | 0.0075 | 0.0153 |
| O | none | 1.00 | single | 0.20 | single | 0.20 | 1.40 | 0.0000 | 0.0000 |
| P | single | 0.20 | single | 0.20 | none | 1.00 | 1.40 | 0.0812 | 0.1137 |
| Q | none | 1.00 | single | 0.20 | single | 0.20 | 1.40 | 0.0542 | 0.0758 |
| R | single | 0.20 | single | 0.20 | none | 1.00 | 1.40 | 0.0075 | 0.0105 |
| S | none | 1.00 | none | 1.00 | dual | 0.04 | 2.04 | 0.0000 | 0.0000 |
| T | single | 0.20 | none | 1.00 | single | 0.20 | 1.40 | 0.0000 | 0.0000 |
| U | dual | 0.04 | none | 1.00 | single | 0.20 | 1.24 | 0.0000 | 0.0000 |
| V | none | 1.00 | single | 0.20 | dual | 0.04 | 1.24 | 0.0000 | 0.0000 |
| W | none | 1.00 | dual | 0.04 | single | 0.20 | 1.24 | 0.0030 | 0.0037 |
| X | dual | 0.04 | single | 0.20 | none | 1.00 | 1.24 | 0.0045 | 0.0056 |
| Y | single | 0.20 | none | 1.00 | dual | 0.04 | 1.24 | 0.0000 | 0.0000 |
| Z | single | 0.20 | dual | 0.04 | none | 1.00 | 1.24 | 0.0045 | 0.0056 |
| SUM | | | | | | | | | 2.3043 |

In the example described above, a truth count was determined over a number of sources (in this case 3 sources) providing the same data object value (not shown). The methodology described above may be repeated for different data object values provided by various sources. In this manner, the truth count for published data object values may be determined. For example, an actual true value for a data object may be assigned by identifying the data object value with the highest truth count, after a truth discovery process, as described above, has determined truth counts for each published data object value.

In some embodiments, additional or alternative truth discovery results may also be generated. For example, the truth count generated in Table 4 may be reported as a truth probability (2.3043/3.000=0.7681 or 76.81%) for the analyzed data object value. A similar truth probability may be generated for other published data object values. In some instances, the data object value having the highest truth probability is identified as the actual true value. Still further, the truth probability may be weighted by the number of sources to yield a weighted truth probability for each data object value. In certain embodiments, combinations of truth discovery results may be used to ascertain the most likely true value for the data object value.

The results generated in the truth discovery example presented above may further be used to provide information about sources. Generally, sources may provide a plurality of data objects, while each data object value may be provided by a plurality of sources. Thus, an accuracy for a given source may be determined as a number of true data objects provided by the source divided by a total number of data objects provided by the source. This determination may be performed when truth discovery has been performed for the data objects provided by the source. Additionally, for a given source, a probability that a data object value is true may be estimated by dividing the sum of the truth probabilities for data object values provided by the source by the total number of data objects provided by the source. In certain embodiments, additional methods may be applied to interpret and analyze sources using truth discovery results.

Figure 5:
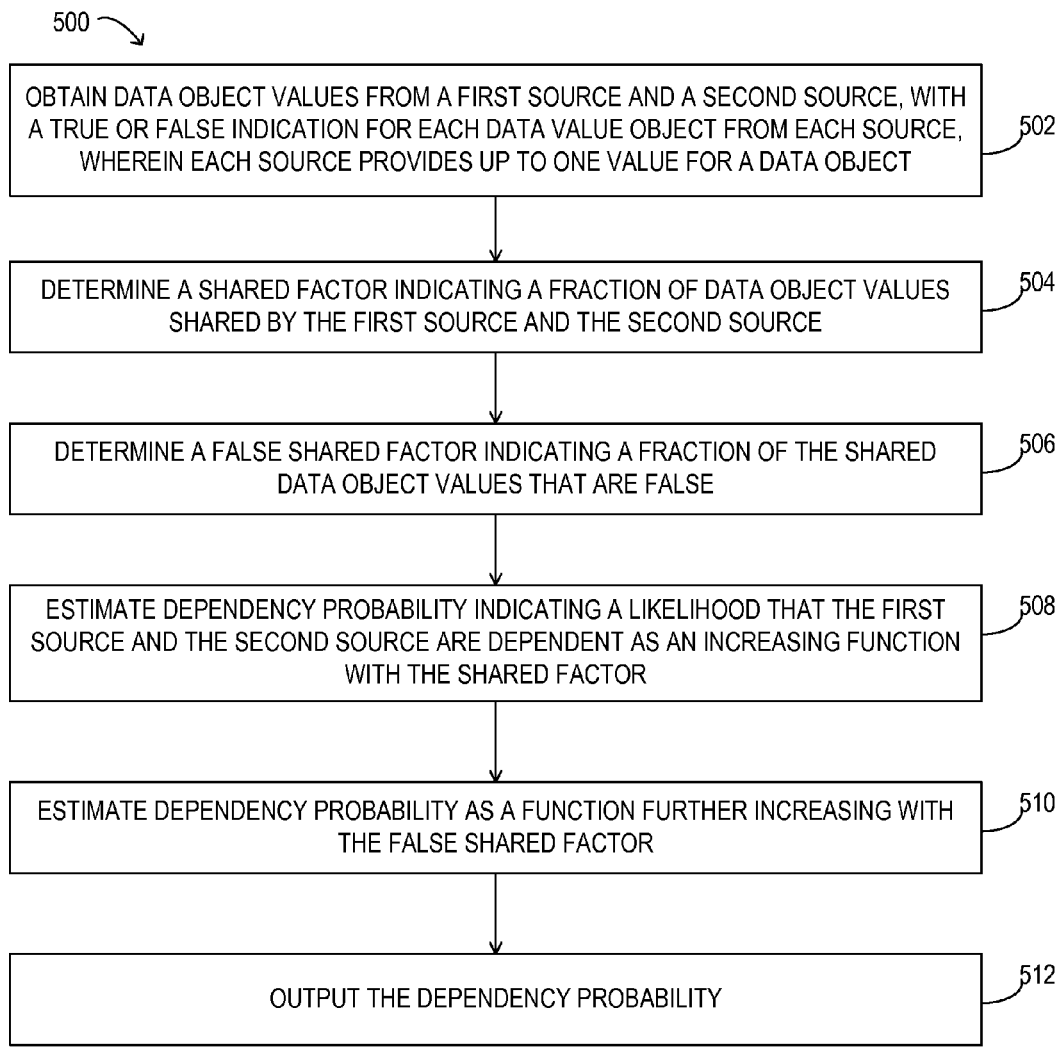
FIG. 5 is a block diagram of selected elements of an embodiment of a process to determine dependency probability between two sources.

Turning now to FIG. 5, a block diagram of selected elements of an embodiment of process 500 to determine dependency probability between two sources is illustrated. In some implementations, process 500 may correspond to operations performed during source dependency 110 (see FIG. 1), while the results of process 500 may be similar to the values for D and I shown in Table 2 above. It is noted that certain operations in process 500 may be combined, omitted, or rearranged, as desired in some embodiments.

As shown in FIG. 5, process 500 is described relative to a first source and a second source (not shown), representing an arbitrary pair of sources. It will be understood that process 500 may be repeated for different pairs of sources in situations where a plurality of sources are present. In some embodiments, process 500 is repeated until dependency probability for all possible pairs of sources in a given system has been determined.

Data object values from a first source and a second source may be obtained, along with a true or false indication for each data value object from each source, wherein each source provides up to one value for a data object (operation 502). Values and true/false indications from a plurality of data object values from the first and the second source may be obtained. Some sources may not provide a data object value for a given data object. In some cases, the true/false indication may be obtained from a truth discovery process, for example true/false determination 104 (see FIG. 1). A shared factor, indicating a fraction of data object values shared by the first source and the second source, may be determined (operation 504). In some instances, the shared factor is determined relative to the total number of data objects provided in combination by the first and second source. Data objects provided by both the first and second source may be counted singularly in the total number of data objects.

A false shared factor, indicating a fraction of the shared data object values that are false, may be determined (operation 506). The determination of false data object values may rely on the true or false indication of data object values obtained in operation 502. Next, a dependency probability, indicating a likelihood that the first and the second source are dependent, may be estimated as an increasing function with the shared factor (operation 508). The increasing function in operation 508 may be linear, or may exhibit another sensitivity to the shared factor.

The dependency probability may then be estimated as a function further increasing with the false shared factor (operation 510). The shared factor and the false shared factor may both contribute to the dependency probability. The function may include a linear term for the false shared factor, or exhibit another sensitivity to the false shared factor. In some embodiments, either the shared factor or the false shared factor may be omitted. The shared factor and/or the false shared factor may be weighted, for example, according to some number of data objects. The dependency probability may then be output (operation 512). The dependency probability for the first and second data object value may be displayed, printed, transmitted via network, or recorded on a storage medium in operation 512. An independency probability for the pair of sources may be calculated as one minus the dependency probability, reflecting that independency probability is related to dependency probability, such that their sums are unity. The independency probability may also be output in operation 512.

Figure 6:
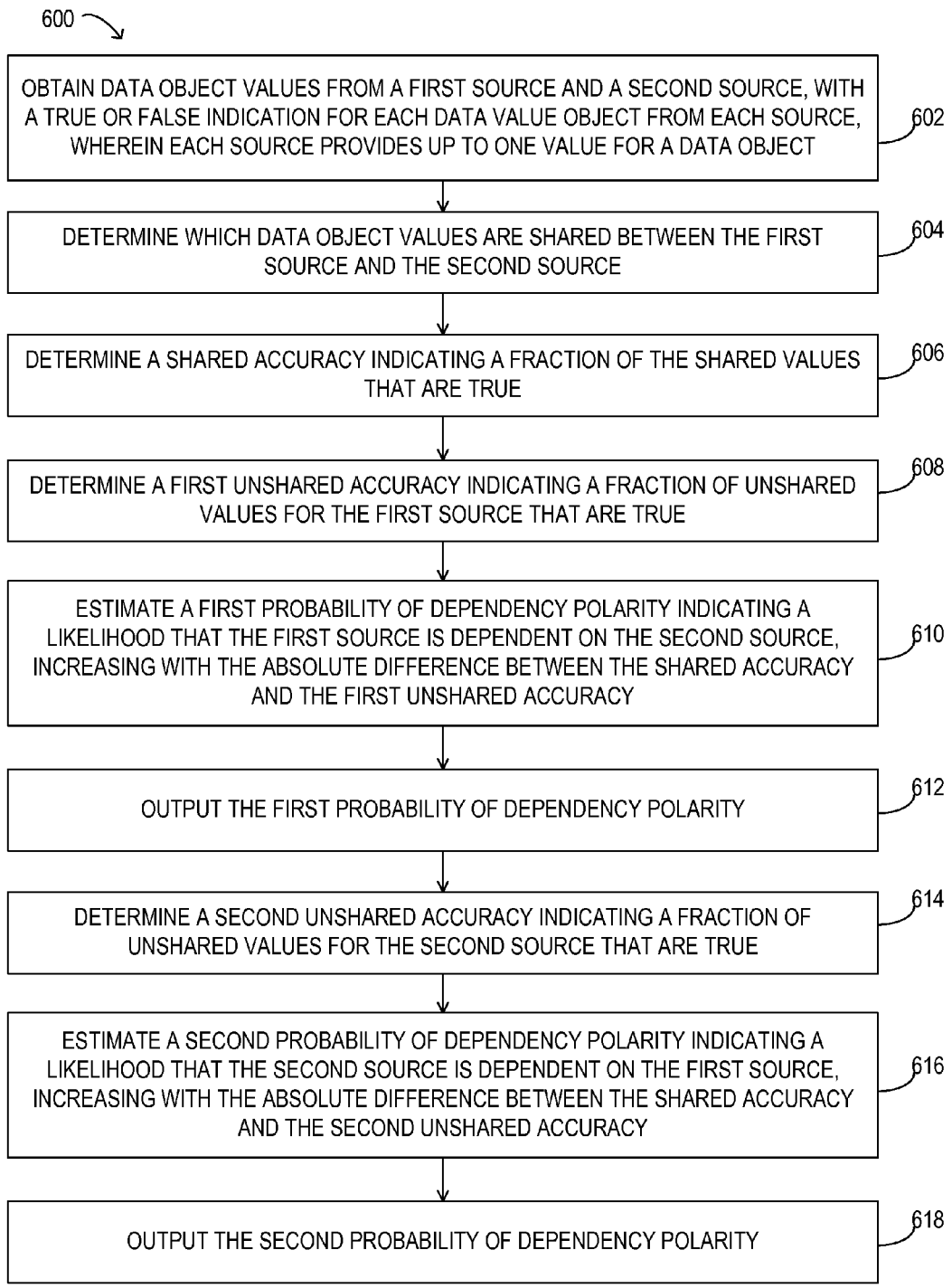
FIG. 6 is a block diagram of selected elements of an embodiment of a process to determine dependency polarity probability between two sources.

Turning now to FIG. 6, a block diagram of selected elements of an embodiment of process 600 to determine dependency polarity probability between two sources is illustrated. In some implementations, at least some portions of process 600 may correspond to operations performed during source dependency polarity 108 (see FIG. 1), while the results of process 600 may be similar to the values for P shown in Table 2 above. In some embodiments, certain portions of process 600 may correspond to operations performed by source accuracy 106 (see FIG. 1). It is noted that certain operations in process 600 may be combined, omitted, or rearranged, as desired in some embodiments.

As shown in FIG. 6, process 600 is described relative to a first source and a second source (not shown), representing an arbitrary pair of sources. It will be understood that process 600 may be repeated for different pairs of sources in situations where a plurality of sources are present. In some embodiments, process 600 is repeated until dependency polarity probability for all possible pairs of sources in a given system has been determined.

Data object values from a first source and a second source may be obtained, along with a true or false indication for each data value object from each source, wherein each source provides up to one value for a data object (operation 602). Values and true/false indications from a plurality of data object values from the first and the second source may be obtained. Some sources may not provide a data object value for a given data object. In some cases, the true/false indication may be obtained from a truth discovery process, for example true/false determination 104 (see FIG. 1). Data object values, which are shared between the first source and the second source, may be determined (operation 604). The data objects provided by both the first and second source having matching data object values may be determined in operation 604.

A shared accuracy, indicating a fraction of shared values that are true, may then be determined (operation 606). The true or false indication from operation 602 may be used to determine which shared values are true in operation 606. A first unshared accuracy, indicating a fraction of unshared values for the first source that are true, may be determined (operation 608). In some embodiments, first and second sources having a sufficient plurality of shared and unshared data object values to be statistically relevant may be selected for use with process 600.

A first probability of dependency polarity, indicating a likelihood that the first source is dependent on the second source, and increasing with the absolute difference between the shared accuracy and the first unshared accuracy, may be estimated (operation 610). The increase in operation 610 may be a linear function. The first probability of dependency polarity may then be output (operation 612). The first dependency polarity probability may be displayed, printed, transmitted via network, or recorded on a storage medium in operation 612.

A second unshared accuracy, indicating a fraction of unshared values for the second source that are true, may be determined (operation 614). A second probability of dependency polarity, indicating a likelihood that the second source is dependent on the first source, and increasing with the absolute difference between the shared accuracy and the second unshared accuracy, may be estimated (operation 616). The increase in operation 616 may be a linear function. The second probability of dependency polarity may then be output (operation 618). The first dependency polarity probability may be displayed, printed, transmitted via network, or recorded on a storage medium in operation 618. The first and second probability of dependency polarity may be normalized such that their sum is unity, reflecting the fact that only two directions for dependency polarity are possible between the pair of sources.

Figure 7:
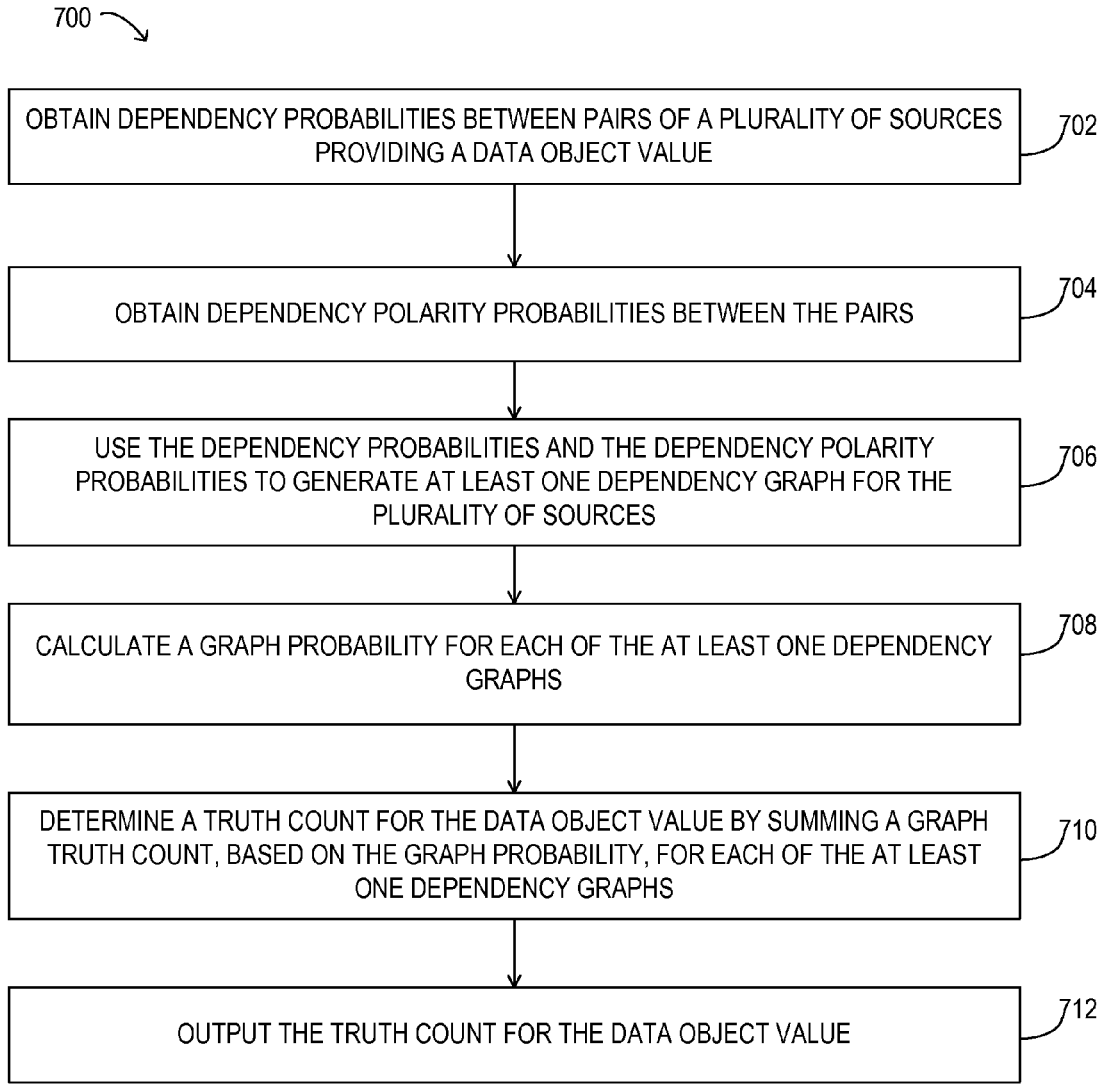
FIG. 7 is a block diagram of selected elements of an embodiment of a truth discovery process.

Turning now to FIG. 7, a block diagram of selected elements of an embodiment of truth discovery process 700 is illustrated. In some implementations, at least some portions of truth discovery process 700 may correspond to operations performed during true/false determination 104 (see FIG. 1), while the results of truth discovery process 700 may be similar to values shown in Tables 3 and 4 above. Truth discovery process 700 may provide operations to account for dependency between sources and accuracy of sources. It is noted that certain operations in truth discovery process 700 may be combined, omitted, or rearranged, as desired in some embodiments.

As shown in FIG. 7, truth discovery process 700 is described relative to arbitrary pairs of sources among a plurality of sources providing a data object value. Thus, truth discovery process 700 may be performed for all sources providing the same data object value (not shown), to determine a measure of truthfulness, such as a truth count or a truth probability, for the data object value. Truth discovery process 700 may accordingly be repeated for other data object values to determine corresponding measures of truthfulness for different data object values provided by sources of the data object. In some embodiments, truth discovery process 700 is repeated until truth counts are obtained for all data object values provided for a data object.

Dependency probabilities between pairs of a plurality of sources providing a data object value may be obtained (operation 702). The dependency probabilities obtained in operation 702 may be the result of process 500 (see FIG. 5). Dependency polarity probabilities between the pairs may be obtained (operation 704). The dependency polarity probabilities obtained in operation 704 may be the result of process 600 (see FIG. 6). Examples of values obtained in operations 702 and 704 are shown in Table 2 (see D, P, I).

The dependency probabilities and dependency polarity probabilities may be used to generate at least one dependency graph for the plurality of sources (operation 706). Dependency graphs may be generated in operation 706 in a manner similar to that described with respect to Table 1 and FIGS. 3A-D. The number of sources in the plurality of sources may be a large number, such as N representing Nth source 291 (see FIG. 2), which may lead to a very large number of possible dependency graphs being enumerated and generated in operation 706. In some embodiments, the number of dependency graphs generated in operation 706 may be less than the largest possible enumeration of graph permutations.

It is noted that a reduction in the number of dependency graphs (i.e., by elimination or exclusion of graphs) may be performed using logical assumptions about the nature of the sources, or based on the values obtained in operations 702 and 704. In one example, it may be known that a pair of sources are physically unable to communicate with each other, such that dependency between the pair may be excluded a priori in truth discovery process 700, or other processes from which truth discovery process 700 obtains information. In another example, if a certain dependency edge was found to have a zero or sufficiently small probability value (see $D_{23}$; Tables 2 and 3), then enumerated graphs including the dependency edge may be eliminated from further consideration in truth discovery process 700, since such graphs would exhibit null probability and make no contribution to the results. Certain permutations of dependency graphs may be omitted as a general rule, such as graphs exhibiting cyclical dependencies between sources, similar to the example for three sources discussed above, in which Graph AA 342 and Graph BB 344 (see FIG. 3D) were omitted for cyclical dependencies.

Figure 8A:
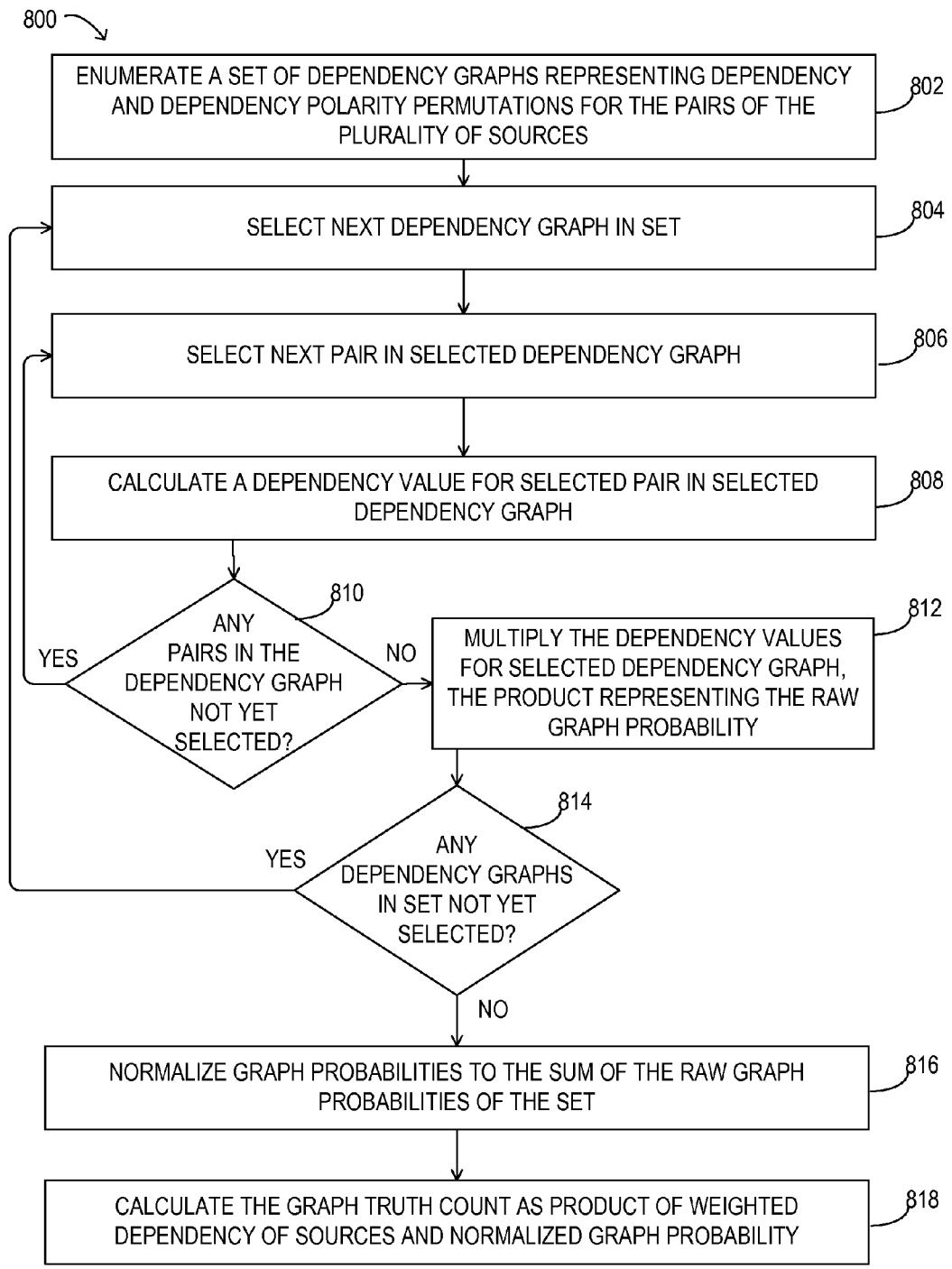
FIGS. 8A-C are block diagrams of selected elements of an embodiment of a truth discovery process.
Figure 8B:
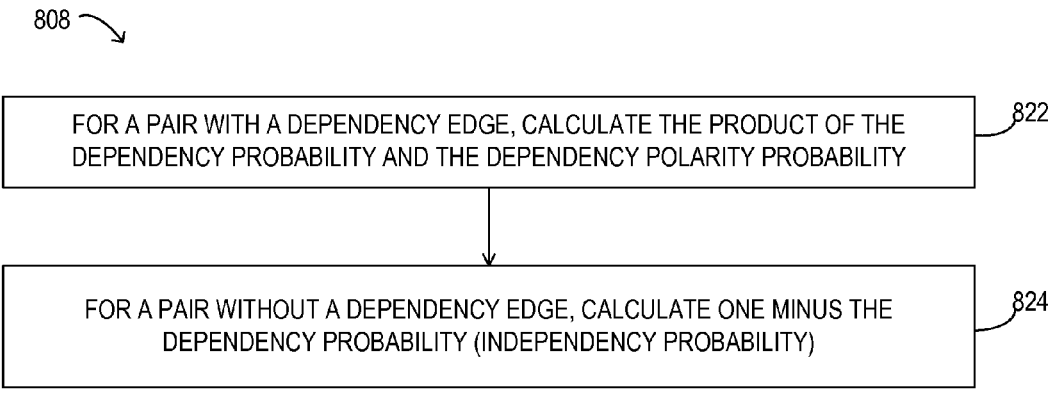
Figure 8C:
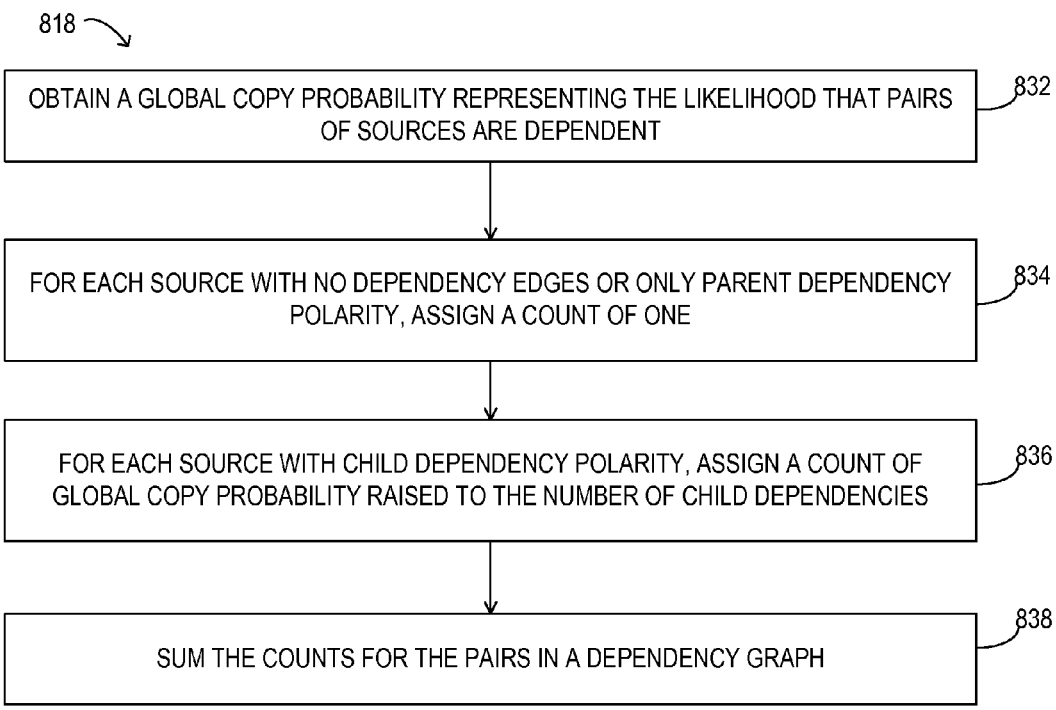

A graph probability may then be calculated for each of the at least one dependency graphs (operation 708). The graph probability may be calculated in a similar manner as the example discussed above with three sources (see Table 3; FIGS. 8A-C). Next, a truth count for the data object value may be determined by summing a graph truth count, based on the graph probability, for each of the at least one dependency graphs (operation 710). The graph truth counts for the enumerated set of graphs may be calculated in a similar manner as the example discussed above with three sources (see Table 4, FIGS. 8A-C). The truth count for the data object value may then be output (operation 712). The truth count may be displayed, printed, transmitted via network, or recorded on a storage medium in operation 712.

Turning now to FIG. 8A, a block diagram of selected elements of an embodiment of truth discovery process 800 is illustrated. In some embodiments, at least some portions of truth discovery process 800 may correspond to operations 706-710 performed during truth discovery process 700 (see FIG. 7).

A set of dependency graphs representing dependency and dependency polarity permutations for the pairs of the plurality of sources may be enumerated (operation 802). The process for enumerating a set of dependency graphs in operation 802 may be similar to the example described above for three sources (see Table 1; FIGS. 3A-D), although it will be understood that the number of the plurality of sources N (see FIG. 2, Nth source 291) may be substantially larger than three.

After enumeration of the set of graphs, truth discovery process 800 may process each pair in each graph, as will now be discussed in detail in one exemplary embodiment. A next dependency graph in the set may be selected (operation 804). Table 1 contains an example of an enumerated set of graphs (see also FIGS. 3A-D). A next pair in the selected dependency graph may then be selected (operation 806). A dependency value may be calculated for the pair in the selected graph (operation 808). The dependency value may be calculated using values similar to those provided in Table 2 (see FIG. 8B).

Next, a determination is made whether any pairs in the selected dependency graph have not yet been selected (operation 810). If the determination in operation 810 is YES, then process 800 returns to operation 806, whereby a next pair is selected. If the determination in operation 810 is NO, then the dependency values for the selected dependency graph may be multiplied to yield a product representing the raw graph probability (operation 812). A determination may then be made whether any dependency graphs in the set have not yet been selected (operation 814). If the determination in operation 814 is YES, then process 800 returns to operation 804, whereby a next dependency graph is selected.

If the determination in operation 814 is NO, then the graph probabilities may be normalized to the sum of the raw graph probabilities of the set (operation 816). In one example, the raw graph probabilities may be summed, and each raw graph probability divided by the sum to perform the normalization, such that the sum of the normalized graph probabilities is unity (see Table 3). The graph truth count may then be calculated as a product of a weighted dependency of sources and the normalized graph probability (operation 818). The graph truth count may be calculated using values similar to those provided in Table 4 (see FIG. 8C).

Referring to FIG. 8B, a block diagram of selected elements of an embodiment of truth discovery process 800 is illustrated. Specifically, FIG. 8B depicts one embodiment in detail of operation 808 in process 800 (see FIG. 8A), in which a dependency value for a selected pair in a selected dependency graph may be calculated. For a pair with a dependency edge, the product of the dependency probability and the dependency polarity probability may be calculated (operation 822). The product calculated in operation 822 may be similar to the value DP shown in Table 2. It is noted that the value of the dependency polarity probability depends on the orientation of the edge with respect to the two sources in the pair (i.e., the parent-child relationship between the two sources), while the dependency probability does not. For a pair without a dependency edge, one minus the dependency probability, or the independency probability, may be calculated (operation 824). The product calculated in operation 824 may be similar to the value I shown in Table 2. The results of calculations similar to those in operation 808 are shown for the three source example in Table 3.

Referring now to FIG. 8C, a block diagram of selected elements of an embodiment of truth discovery process 800 is illustrated. Specifically, FIG. 8C depicts one embodiment in detail of operation 818 in process 800 (see FIG. 8A), in which a graph truth count may be calculated as a product of a weighted dependency of sources and the normalized graph probability. In FIG. 8C, an exemplary embodiment of a calculation of the weighted dependency of sources is presented.

A global copy probability representing the likelihood that pairs of sources are dependent may be obtained (operation 832). For each source with no dependency edges, or only parent dependency polarity, a count of one may be assigned (operation 834). For each source with child dependency polarity, a count of the global copy probability raised to the number of child dependencies may be assigned (operation 836). The value assigned in operation 836 may be given by Equation 13 above. The counts may be summed for the pairs in a dependency graph (operation 838). The summed counts may represent the weighted dependency of sources used in process 800 and shown in Table 4.

Figure 9:
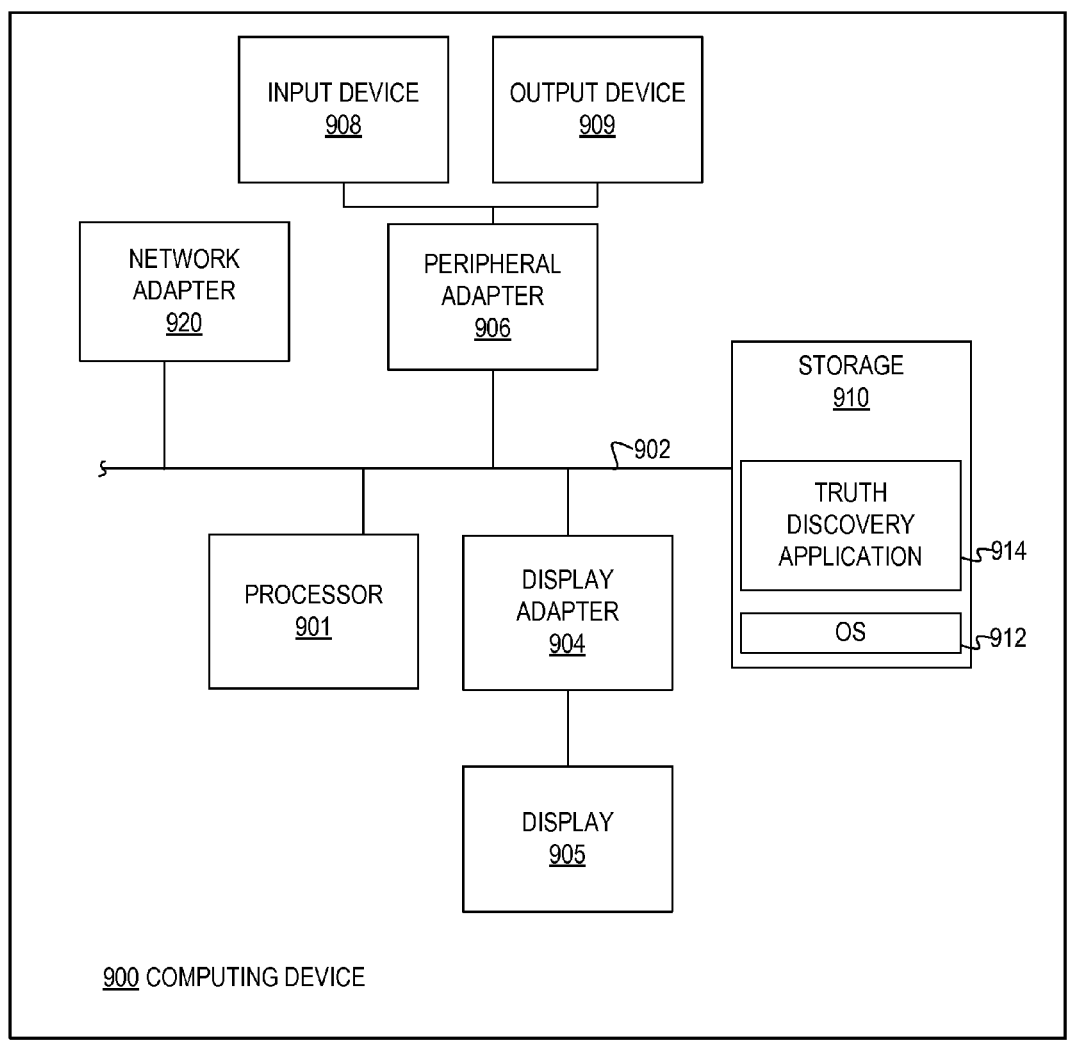
FIG. 9 is a block diagram of selected elements of an embodiment of a computer system.

Referring now to FIG. 9, a block diagram illustrating selected elements of an embodiment of a computing device 900 is presented. In the embodiment depicted in FIG. 9, device 900 includes processor 901 coupled via shared bus 902 to storage media collectively identified as storage 910.

Device 900, as depicted in FIG. 9, further includes network adapter 920 that interfaces device 900 to a network (not shown in FIG. 9). In embodiments suitable for use in truth discovery, device 900, as depicted in FIG. 9, may include peripheral adapter 906, which provides connectivity for the use of input device 908 and output device 909. Input device 908 may represent a device for user input, such as a keyboard or a mouse, or even a video camera. Output device 909 may represent a device for providing signals or indications to a user, such as loudspeakers for generating audio signals.

Device 900 is shown in FIG. 9 including display adapter 904 and further includes a display device or, more simply, a display 905. Display adapter 904 may interface shared bus 902, or another bus, with an output port for one or more displays, such as display 905. Display 905 may be implemented as a liquid crystal display screen, a computer monitor, a television or the like. Display 905 may comply with a display standard for the corresponding type of display. Standards for computer monitors include analog standards such as video graphics array (VGA), extended graphics array (XGA), etc., or digital standards such as digital video interface (DVI), high definition multimedia interface (HDMI), among others. A television display may comply with standards such as National Television System Committee (NTSC), Phase Alternating Line (PAL), or another suitable standard. Display 905 may include an output device 909, such as one or more integrated speakers to play audio content, or may include an input device 908, such as a microphone or video camera.

Storage 910 encompasses persistent and volatile media, fixed and removable media, and magnetic and semiconductor media. Storage 910 is operable to store instructions, data, or both. Storage 910 as shown includes sets or sequences of instructions, namely, an operating system 912, and a truth discovery application 914. Operating system 912 may be a UNIX or UNIX-like operating system, a Windows® family operating system, or another suitable operating system.

It is noted that in some embodiments, device 900 represents a computing platform for performing truth discovery methodology 100, shown in FIG. 1. In some cases, truth discovery application 914 may be configured to execute processes 500, 600, 700, and 800, along with other methods described herein.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A truth discovery method for a data object value provided by a plurality of sources, comprising:
    obtaining dependency probabilities for pairs of the plurality of sources of the data object value;
    obtaining dependency polarity probabilities for the pairs of the plurality of sources;
    using the dependency probabilities and dependency polarity probabilities to generate at least one dependence graph for the plurality of sources;
    calculating a graph probability for each of the at least one dependence graphs;
    determining a truth count for the data object value by summing a graph truth count for each of the at least one dependence graphs, wherein the graph truth count is based on the graph probability; and
    outputting the truth count for the data object value.

2. The method of claim 1, wherein said calculating the graph probability further comprises:
    enumerating a set of dependency graphs representing dependency and dependency polarity permutations for the pairs of sources; and
    for each dependency graph in the enumerated set:
        calculating a dependency value for each of the pairs of sources; and
        calculating the graph probability as a product of the dependency values for the pairs.

3. The method of claim 2, wherein said calculating the dependency value further comprises:
    for a pair with a dependency edge, calculating the dependency value as a product of the dependency probability and the dependency polarity probability for the pair; and
    for a pair without a dependency edge, calculating the dependency value as an independency probability, given by one minus the dependency probability, for the pair.

4. The method of claim 3, further comprising:
    calculating a normalized graph probability for a dependency graph by dividing the graph probability for the dependency graph by the sum of the graph probabilities for the set.

5. The method of claim 4, further comprising:
    calculating the graph truth count as a product of a weighted dependency of sources and the normalized graph probability for the dependency graph.

6. The method of claim 5, wherein the weighted dependency of sources is determined by:
    obtaining a global copy probability representing the likelihood that pairs of sources are dependent;
    for each source with no dependency edges or with only parent dependency polarity in the dependency graph, assigning a count of one;
    for each source with at least one child dependency polarity in the dependency graph, assigning a count of the global copy probability raised to the exponent given by the number of child dependency polarities; and
    summing the assigned counts for sources in the dependency graph.

7. The method of claim 1, further comprising:
    determining whether the data object value is true or false by comparing the truth count for the data object value with a threshold truth count.

8. The method of 1, further comprising:
    determining a truth probability for the data object value for the plurality of sources based on the truth count.

9. The method of 8, wherein the truth probability is indicative of a fraction given by the truth count over a number of the plurality of sources.

10. The method of claim 8, further comprising:
    determining an accuracy for sources not included in the plurality of sources based on the truth probability for the data object value.

11. The method of claim 1, further comprising:
estimating a revised dependency probability between the pairs of the plurality of sources based on said determining the truth count.

12. The method of claim 1, further comprising:
estimating a revised probability of dependency polarity between the pairs of the plurality of sources based on said determining the truth count.

13. Computer-readable memory media, including executable instructions for truth discovery of a data object value provided by a plurality of sources, said instructions executable to:
obtain dependency probabilities for pairs of the plurality of sources of the data object value;
obtain dependency polarity probabilities for the pairs of the plurality of sources;
use the dependency probabilities and dependency polarity probabilities to generate at least one dependence graph for the plurality of sources;
calculate a graph probability for each of the at least one dependence graphs;
determine a truth count for the data object value by summing a graph truth count for each of the at least one dependence graphs, wherein the graph truth count is based on the graph probability; and
output the truth count for the data object value.

14. The memory media of claim 13, wherein said instructions to calculate the graph probability further comprise instructions executable to:
enumerate a set of dependency graphs representing dependency and dependency polarity permutations for the pairs of sources; and
for each dependency graph in the enumerated set:
calculate a dependency value for each of the pairs of sources; and
calculate the graph probability as a product of the dependency values for the pairs.

15. The memory media of claim 14, wherein said instructions to calculate the dependency further comprise instructions executable to:
for a pair with a dependency edge, calculate the dependency value as a product of the dependency probability and the dependency polarity probability for the pair; and
for a pair without a dependency edge, calculate the dependency value as an independency probability, given by one minus the dependency probability, for the pair.

16. The memory media of claim 15, further comprising instructions executable to:
calculate a normalized graph probability for a dependency graph by dividing the graph probability for the dependency graph by the sum of the graph probabilities for the set.

17. The memory media of claim 16, further comprising instructions executable to:
calculate the graph truth count as a product of a weighted dependency of sources and the normalized graph probability for the dependency graph.

18. The memory media of claim 17, wherein the weighted dependency of sources is determined by instructions executable to:
obtain a global copy probability representing the likelihood that pairs of sources are dependent;
for each source with no dependency edges or with only parent dependency polarity in the dependency graph, assign a count of one;
for each source with at least one child dependency polarity in the dependency graph, assign a count of the global copy probability raised to the exponent given by the number of child dependency polarities; and
sum the assigned counts for sources in the dependency graph.

19. The memory media of claim 13, further comprising instructions executable to:
determine whether the data object value is true or false by comparing the truth count for the data object value with a threshold truth count.

20. The memory media of claim 13, further comprising instructions executable to:
determine a truth probability for the data object value for the plurality of sources based on the truth count.

21. The memory media of claim 20, wherein the truth probability is indicative of a fraction of the truth count over a number of the plurality of sources.

22. The memory media of claim 20, further comprising instructions executable to:
determine an accuracy for sources not included in the plurality of sources based on the truth probability for the data object value.

23. The memory media of claim 17, further comprising instructions executable to:
estimate a revised dependency probability between the pairs of the plurality of sources based on results of said instructions to determine the truth count.

24. The memory media of claim 17, further comprising instructions executable to:
estimate a revised probability of dependency polarity between the pairs of the plurality of sources based on results of said instructions to determine the truth count.

* * * * *